United States Patent
Yasaki

(10) Patent No.: US 12,050,425 B2
(45) Date of Patent: Jul. 30, 2024

(54) MANAGEMENT SYSTEM AND IMAGE FORMING APPARATUS

(71) Applicant: CANON KABUSHIKI KAISHA, Tokyo (JP)

(72) Inventor: Kosuke Yasaki, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/047,578

(22) Filed: Oct. 18, 2022

(65) Prior Publication Data
US 2023/0127482 A1 Apr. 27, 2023

(30) Foreign Application Priority Data
Oct. 22, 2021 (JP) .................................. 2021-172944

(51) Int. Cl.
G03G 15/00 (2006.01)
G06F 3/04842 (2022.01)

(52) U.S. Cl.
CPC ..... *G03G 15/5033* (2013.01); *G03G 15/5016* (2013.01); *G06F 3/04842* (2013.01)

(58) Field of Classification Search
CPC ............ G03G 15/5016; G03G 15/5033; G06F 3/04842
USPC ............................................................. 399/9
See application file for complete search history.

(56) References Cited

U.S. PATENT DOCUMENTS 7,389,057 B2 * 6/2008 Yamaguchi ........ H04N 1/00007
399/9

FOREIGN PATENT DOCUMENTS

| JP | H0818712 A | | 1/1996 |
| JP | 2019041181 | * | 3/2019 |
| JP | 2019145079 A | | 8/2019 |

* cited by examiner

*Primary Examiner* — Hoan H Tran
(74) *Attorney, Agent, or Firm* — Canon U.S.A., Inc. IP Division

(57) ABSTRACT

A management system includes a plurality of image forming apparatuses and a management apparatus connectable to a device of each image forming apparatus via a network. The management system includes a detection unit that detects a condition of the image forming apparatus, a storage unit that stores condition information acquired by the detection unit detecting the condition, a transmission unit that transmits the condition information stored in the storage unit to the management apparatus, and a display unit that displays information. The display unit displays, on a same screen, data calculated from pieces of condition information of the plurality of image forming apparatuses transmitted to the management apparatus, and the condition information stored in the storage unit.

12 Claims, 19 Drawing Sheets

FIG. 7

| address | time | ID | Data |
|---|---|---|---|
| 0 | 0 | 0 | 680 |
| 1 | 0 | 1 | 2013 |
| 2 | 0 | 2 | 3.5 |
| 3 | 0 | 3 | 980 |
| 4 | 1 | 0 | 702 |
| 5 | 1 | 1 | 2019 |
| 6 | 1 | 2 | 8.9 |
| 7 | 1 | 3 | 970 |
| 8 | 2 | 0 | 715 |
| 9 | 2 | 1 | 2005 |
| 10 | 2 | 2 | 5.6 |
| 11 | 2 | 3 | 978 |
| ⋮ | ⋮ | ⋮ | ⋮ |

353 MEMORY 601 address
602 time
603 ID
604 Data

ID0: FIXING UNIT TEMPERATURE
ID1: BELT MOTOR ROTATIONAL SPEED
ID2: DISTANCE ROLLER HAS MOVED
ID3: TONER DENSITY SENSOR VALUE

MANAGEMENT SYSTEM AND IMAGE FORMING APPARATUS

BACKGROUND

Field of the Disclosure

The present disclosure relates to a management system and an image forming apparatus.

Description of the Related Art

In the related art, a system has been proposed in which records of internal condition information of an apparatus, such as a log at the time of occurrence of an error and an internal temperature of a machine, are kept and displayed on an operation screen to thereby perform equipment maintenance or analyze a failure (Japanese Patent Laid-Open No. 8-18712).

Furthermore, in recent years, a system has been proposed in which condition information is transmitted from a machine to a management apparatus on a network and information on the machine analyzed on the management apparatus is displayed on an operation screen (Japanese Patent Laid-Open No. 2019-145079).

In such a system, if maintenance is necessary, for example, a recorded log is analyzed at a site by a person in charge of maintaining an image forming apparatus, and appropriate maintenance is performed. Thus, even if an anomaly, such as a failure, occurs in the apparatus, the anomaly can be dealt with early. Furthermore, stable operation can be achieved to enable a reduction in user downtime.

In such a system, however, only the condition of a machine can be understood, and an error having occurred in another machine or information during a normal operation is unable to be utilized. For this reason, even if, for example, the recorded condition information of the machine is seen, it is hard to directly determine, for example, which portion of the machine a trouble has occurred in or whether an indicated number is normal or abnormal, and thus maintenance work is inefficient.

SUMMARY

The present disclosure has been accomplished in view of the above-described issues and provides a system that facilitates understanding of the condition of a machine by a person in charge of maintenance and that enables analysis to be performed with ease even if an anomaly occurs.

To solve the above-described issues, a system according to the present disclosure is a management system including a plurality of image forming apparatuses and a management apparatus connectable to a device of each image forming apparatus via a network. The management system includes a detection unit configured to detect a condition of the image forming apparatus, a storage unit configured to store condition information acquired by the detection unit detecting the condition, a transmission unit configured to transmit the condition information stored in the storage unit to the management apparatus, and a display unit configured to display information. The display unit displays, on a same screen, data calculated from pieces of condition information of the plurality of image forming apparatuses transmitted to the management apparatus, and the condition information stored in the storage unit.

Further features of the present disclosure will become apparent from the following description of exemplary embodiments with reference to the attached drawings.

BRIEF DESCRIPTION OF THE DRAWINGS

FIG. 7 is a conceptual diagram illustrating details of internal data of the image forming apparatus according to one or more aspects of the present disclosure.

DESCRIPTION OF THE EMBODIMENTS

An embodiment for implementing the present disclosure will be described below with reference to the drawings. Note that components described in this embodiment are strictly illustrative, and the scope of the present disclosure is not intended to be limited to them.

PRACTICAL EXAMPLE 1

Configuration of System

Figure 1:
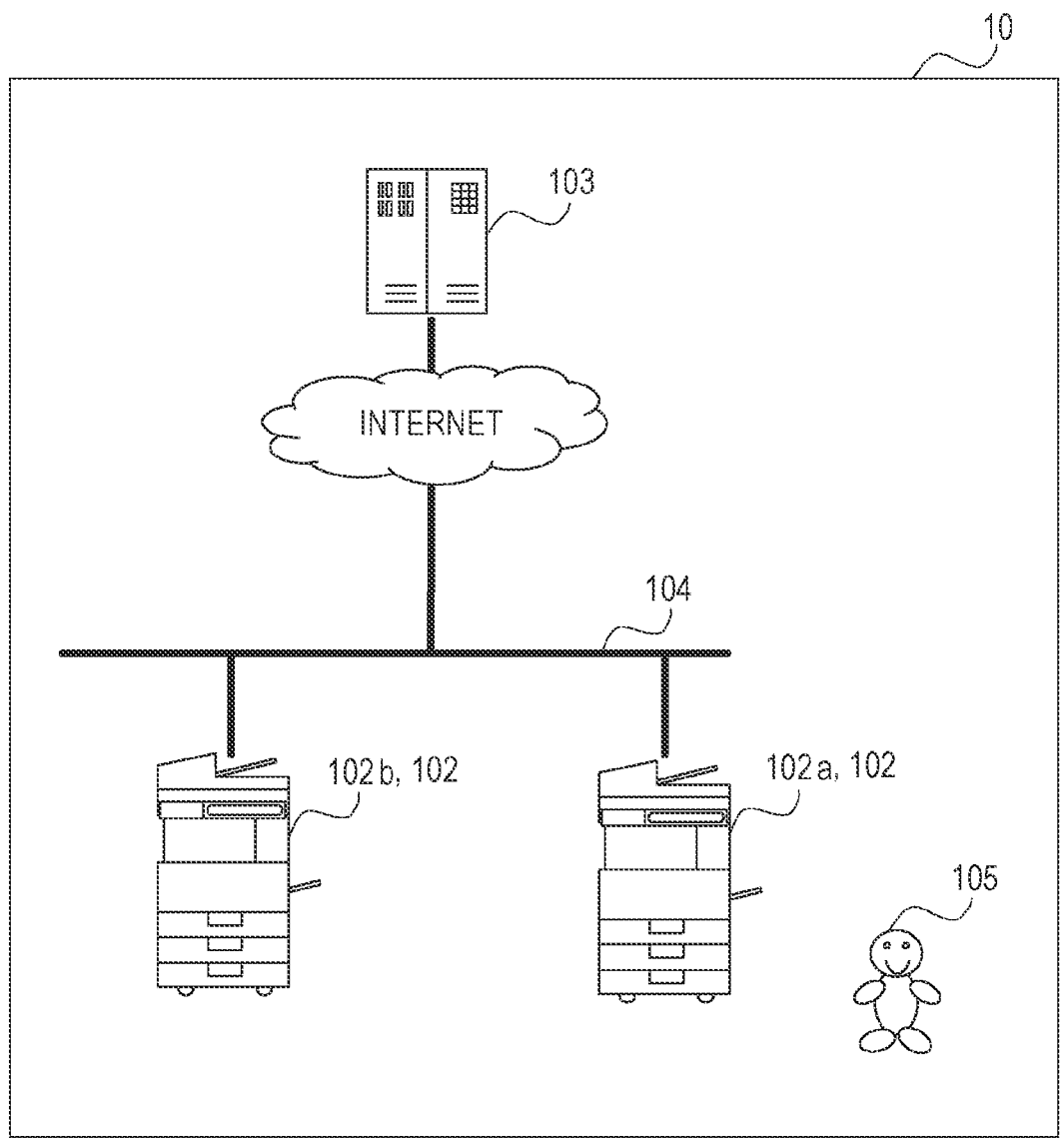
FIG. 1 illustrates a system configuration according to one or more aspects of the present disclosure.

FIG. 1 illustrates an example of a configuration of a management system 10 that is one embodiment of the present disclosure and that provides information to an image forming apparatus 102 in the event of a failure or at the time of maintenance.

This management system 10 includes a plurality of image forming apparatuses 102, and a server 103 that collects and analyzes data representing an operating state of each image forming apparatus 102. Furthermore, the server 103 outputs maintenance information useful for maintenance work from the collected data.

The server 103 is connectable to the plurality of image forming apparatuses 102.

The image forming apparatus 102 is an apparatus constituted, for example, by a multifunction peripheral (MFP) and has a plurality of functions, such as a scan function, a print function, and a copy function. The image forming apparatus 102 receives an operation for selecting a function from a user and also executes a job in accordance with an execution instruction for the job from the user.

Examples of jobs performed in the image forming apparatus 102 include a scan job, a print job, a copy job, and other jobs.

The image forming apparatus 102 is connected to the server 103 via a network 104 including, for example, the Internet and can communicate with the server 103. The image forming apparatus 102 transmits data representing an operating state for managing and monitoring various components incorporated therein, and log data, such as error information during operation, to the server 103 via the network 104.

When the server 103 receives data representing an operating state transmitted from each of the plurality of image forming apparatuses 102, the server 103 analyzes details of the data to thereby generate maintenance information. In a case where a maintenance inspection person 105 who is located near a place where an image forming apparatus 102 is installed performs maintenance work, the server 103 transmits maintenance information held therein to the image forming apparatus 102 that is operated by the maintenance inspection person 105. Subsequently, the maintenance inspection person 105 performs maintenance work in accordance with the maintenance information, and thus a condition in which a job can be executed in the image forming apparatus 102 can be maintained.

Figure 2:
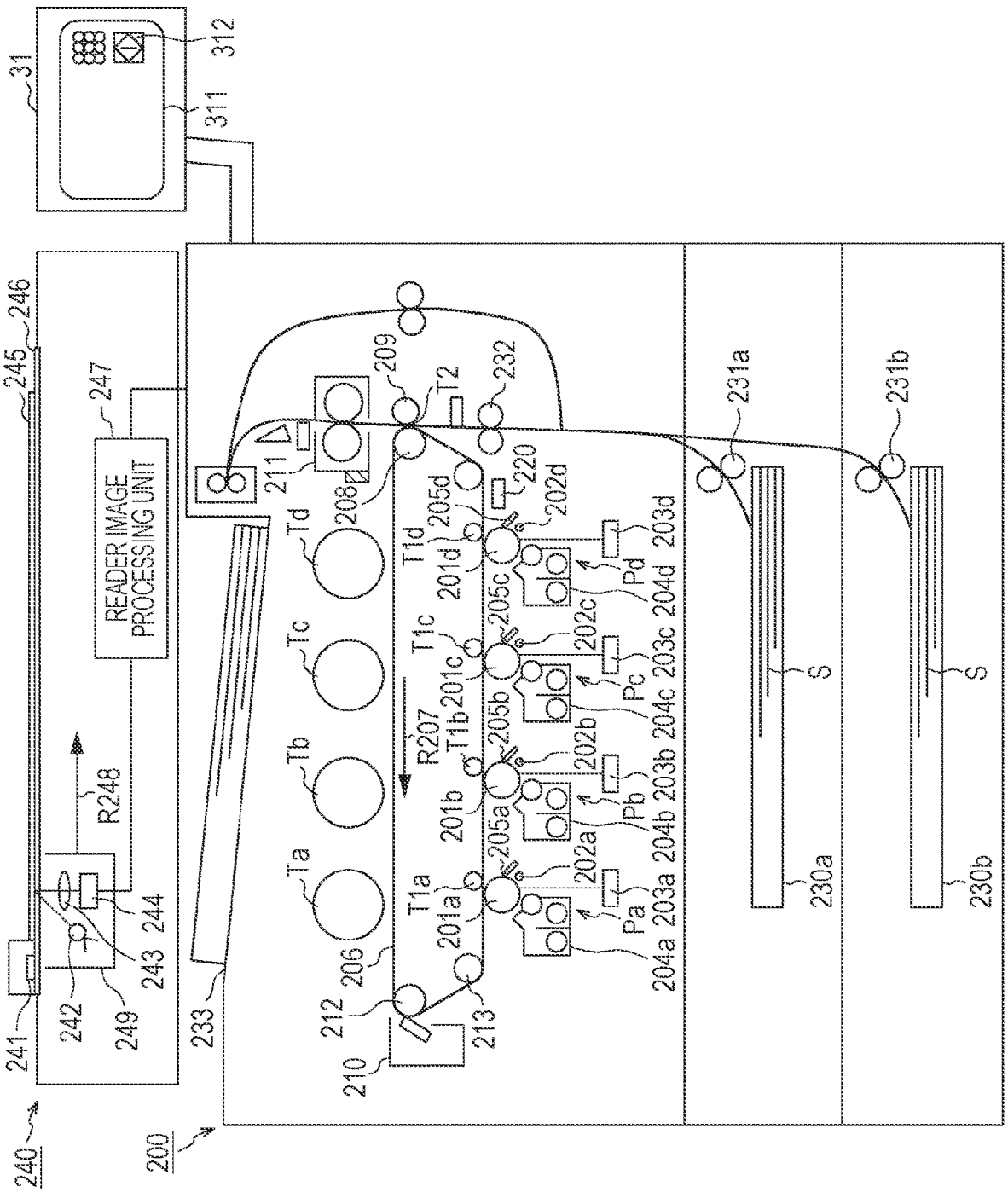
FIG. 2 is a sectional view of a configuration of an image forming apparatus according to one or more aspects of the present disclosure.

FIG. 2 illustrates a configuration of the image forming apparatus 102. The image forming apparatus 102 can be implemented, for example, by a printer, copying machine, multifunction apparatus, or facsimile machine that forms a color image by using an electrophotographic method. The image forming apparatus 102 is an image forming apparatus using a so-called intermediate transfer tandem system in which four image forming units Pa to Pd are arranged next to each other on an intermediate transfer belt 206.

The configuration and functions of the image forming apparatus 102 will be described below with reference to FIG. 2. The image forming apparatus 102 includes a console panel 31, a printer unit 200, and a reader unit 240.

The console panel 31 includes a display unit 311, and an operation unit 312 constituted, for example, by a touch panel, and is directly operated by the user or the maintenance inspection person 105. An instruction for execution of the copy job can be provided so that an original document 245 is scanned by the reader unit 240 to be described and so that an image is formed on a recording material S by the printer unit 200 to be described, or maintenance information can be checked.

Figure 3:
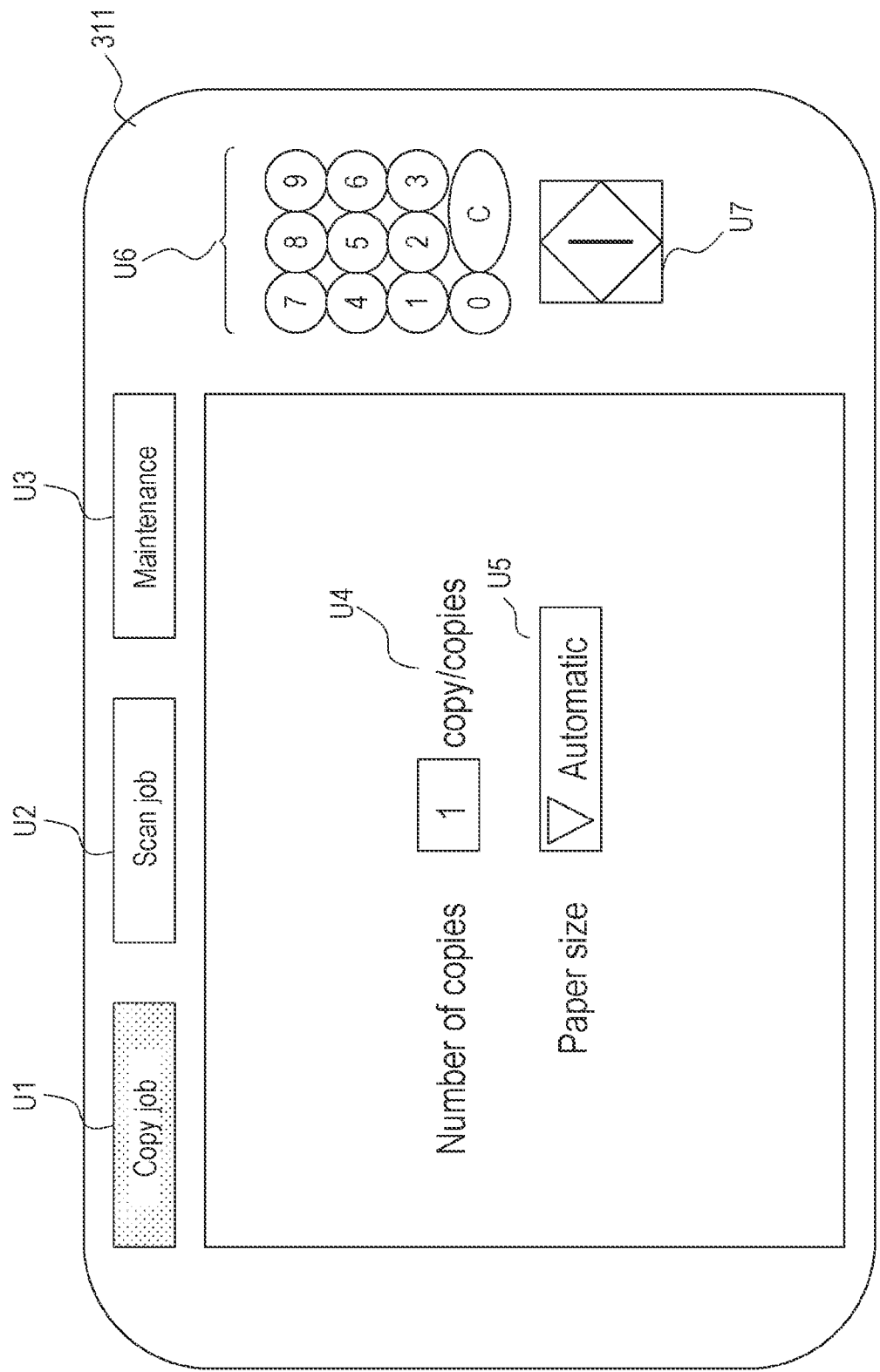
FIG. 3 illustrates an example displayed on a console panel according to one or more aspects of the present disclosure.

Specifically, as illustrated in FIG. 3, there are included the display unit 311, and the operation unit 312 composed of touch panel keys (U1 to U7). For example, in a case where the copy job is executed, the user or the maintenance inspection person 105 selects a copy key U1. Subsequently, for example, for the number of copies U4 and a paper size U5 that are displayed, entries are made by using numeric keys U6, and finally a start button U7 is touched to enable the copy job to be executed.

Recording materials S, such as sheets, on which an image is to be formed are loaded in recording material storages 230a and 230b and are fed by a feeding roller 231a or 231b employing a friction separation method in accordance with a point in time when an image is formed by the image forming units Pa to Pd. The feeding rollers 231a and 231b convey a recording material S to a registration roller 232 through a conveyance path. The registration roller 232 corrects the skew of the recording material S and adjusts timing to convey the recording material S to a secondary transfer portion T2.

The printer unit 200 forms an image by using the image forming units Pa to Pd. The image forming units Pa to Pd includes photosensitive members 201a to 201d, chargers 202a to 202d, exposure devices 203a to 203d, development devices 204a to 204d, primary transfer portions T1a to T1d, and photosensitive member cleaners 205a to 205d. The chargers 202a to 202d uniformly charge surfaces of the photosensitive members 201a to 201d. The photosensitive members 201a to 201d are driven to rotate and are irradiated with light by the exposure devices 203a to 203d. The exposure devices 203a to 203d irradiate the photosensitive members 201a to 201d with light rays modulated in accordance with image information of an image to be formed. Thus, electrostatic latent images based on the image are formed on the photosensitive members 201a to 201d.

The development devices 204a to 204d develop the electrostatic latent images formed on the photosensitive members 201a to 201d by using a developing agent. In the present embodiment, toner is used as a developing agent. The development devices 204a to 204d perform development to form toner images by causing toner to adhere to the photosensitive member 201a to 201d on which the electrostatic latent images have been formed. The primary transfer portions T1a to T1d are subjected to application of a predetermined amount of pressure and a predetermined electrostatic load bias to transfer the toner images from the photosensitive members 201a to 201d to the intermediate transfer belt 206. At this time, the toner images formed on the respective photosensitive members 201a to 201d are transferred onto the intermediate transfer belt 206 so as to be superimposed on one another.

The image forming unit Pa generates a yellow toner image. The image forming unit Pb generates a magenta toner image. The image forming unit Pc generates a cyan toner image. The image forming unit Pd generates a black toner image. Note that the number of colors of toner images to be formed is not limited to four colors. Although the development devices 204a to 204d according to the present embodiment contain a two-component developing agent obtained by mixing non-magnetic toner and a magnetic carrier, a one-component developing agent composed of only magnetic toner or non-magnetic toner may be used.

Yellow, magenta, cyan, and black toner images are transferred onto the intermediate transfer belt 206 so as to be superimposed on one another, and thus a full-color toner image is formed. Toner remaining on the photosensitive members 201a to 201d after transfer has been achieved is recovered by the photosensitive member cleaners 205a to 205d. When the amounts of toner contained in the development devices 204a to 204d fall below a predetermined amount, the development devices 204a to 204d are replenished with toner from toner bottles Ta to Td, which are each a replenishment container for a developing agent.

The intermediate transfer belt 206 is provided in an intermediate transfer belt frame, which is not illustrated, and is an endless belt supported under tension by a secondary transfer inner roller 208, a tension roller 212, and a secondary transfer upstream roller 213. The intermediate transfer belt 206 is driven to rotate in a direction of an arrow R207 by the secondary transfer inner roller 208, the tension roller 212, and the secondary transfer upstream roller 213.

The intermediate transfer belt 206 on which the full-color toner image has been formed rotates to thereby convey the toner image to the secondary transfer portion T2.

The recording material S and the toner image formed on the intermediate transfer belt 206 are conveyed so that they coincide with each other at the secondary transfer portion T2. The secondary transfer portion T2 is a transfer nip portion formed by the secondary transfer inner roller 208 and a secondary transfer outer roller 209 that are disposed to face each other, and is subjected to application of a predetermined pressure and a predetermined electrostatic load bias to thereby cause the toner image to be adsorbed on the recording material S. Thus, the secondary transfer portion T2 transfers the toner image on the intermediate transfer belt 206 onto the recording material S. Toner remaining on the intermediate transfer belt 206 after transfer has been achieved is recovered by a transfer cleaner 210.

The recording material S onto which the toner image has been transferred is conveyed by the secondary transfer outer roller 209 from the secondary transfer portion T2 to a fixing unit 211. The fixing unit 211 applies a predetermined pressure and a predetermined amount of heat to the recording material S in a fixing nip formed by rollers facing each other, so that the toner image is fused and fixed to the recording material S. The fixing unit 211 includes a heater serving as a heat source and is controlled so that an optimal temperature is maintained at all times. The recording material S to which the toner image has been fixed is output onto a discharge tray 233. For two-sided image formation, the recording material S is reversed and conveyed to the registration roller 232 by a reversing and conveying mechanism.

A density detection sensor 220 for detecting a toner density is provided near the intermediate transfer belt 206. The density detection sensor 220 is disposed between the photosensitive member 201d and the secondary transfer outer roller 209 to detect a toner pattern of each color formed on the intermediate transfer belt 206.

The reader unit 240 is a scanner that scans an image formed on the original document 245. The original document 245 is placed on a platen glass 246 so that a side of the original document 245 on which an image is formed faces a platen glass 246 side. The reader unit 240 transmits image data representing the scanned image to the printer unit 200. The reader unit 240 includes a reading unit 249 and a reader image processing unit 247.

In the reading unit 249, a light emitting unit 242, an optical system 243, and a light receiving unit 244 are integrally provided. The reading unit 249 is, for example, a line sensor extending toward the rear of FIG. 2 and scans an image from the entire surface of the original document 245 while moving in a direction of an arrow R248. The light emitting unit 242 irradiates the original document 245 with light. The light receiving unit 244 receives light reflected off the original document 245 through the optical system 243. Light reception results are transmitted to the reader image processing unit 247. The reader image processing unit 247 generates, in accordance with the light reception results from the light receiving unit 244, image data representing the image formed on the original document 245. Furthermore, the reader image processing unit 247 also functions as a sensor that measures, in accordance with the light reception results from the light receiving unit 244, an image density of the image formed on the original document 245. The reader image processing unit 247 transmits the image data and the measured image density to the printer unit 200 via a system control unit.

Figure 4:
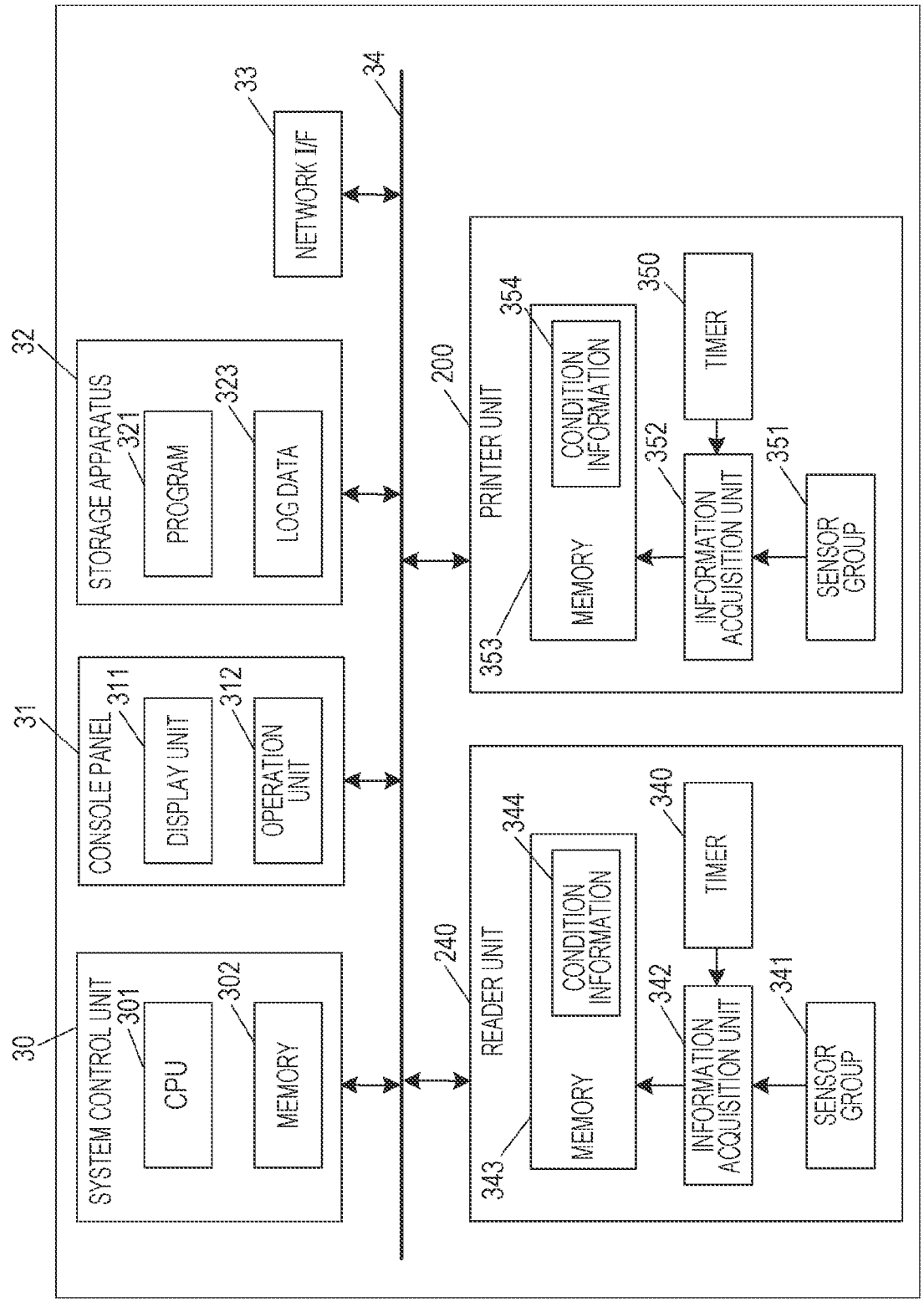
FIG. 4 illustrates a hardware configuration of the image forming apparatus according to one or more aspects of the present disclosure.

FIG. 4 illustrates a hardware configuration of the image forming apparatus 102.

The image forming apparatus 102 includes a system control unit 30, the console panel 31, a storage apparatus 32, a network interface 33, the reader unit 240, and the printer unit 200. Data input/output between these units can be performed via a data bus 34.

The system control unit 30 includes a central processing unit (CPU) 301 and a memory 302 and performs centralized control of operations performed in the image forming apparatus 102.

The CPU 301 is a hardware processor capable of executing a program 321. For example, when the power of the image forming apparatus 102 is turned on, the CPU 301 reads the program 321 stored in the storage apparatus 32 and executes it to thereby function as various types of processing units to be described and perform centralized control of operations performed by each unit.

In particular, in the present embodiment, when the CPU 301 executes the program 321, the CPU 301 communicates with the reader unit 240 and the printer unit 200 to be described to acquire condition information 344 and condition information 354. Subsequently, the CPU 301 performs transmission and reception to and from the server 103 through the network interface 33 to be described and also operates so that a graphical user interface (GUI) is displayed on the console panel 31.

The memory 302 is a memory that temporarily stores, for example, data to be used when the CPU 301 executes a process based on the program 321.

The storage apparatus 32 is a nonvolatile storage apparatus constituted, for example, by a hard disk drive (HDD). In the storage apparatus 32, in addition to the program 321 executed by the CPU 301, the condition information 344 and the condition information 354, which are time-series data of sensor measurement values in the reader unit 240 and the printer unit 200, are stored as log data 323.

The network interface 33 connects the image forming apparatus 102 to the network 104. The image forming apparatus 102 communicates with the server 103 via this network interface 33.

The reader unit 240 includes a sensor group 341, and the sensor group 341 includes at least one sensor that monitors an operating state of a movable component that operates when the reader unit 240 performs document scanning. The sensor group 341 performs a measurement operation in accordance with a request from the system control unit 30, and the condition information 344 obtained by measuring an operating state of a movable component is temporarily stored in a memory 343 by an information acquisition unit 342 after measurement. Subsequently, the condition information 344 is transmitted to the system control unit 30 and is also stored as the log data 323 into the storage apparatus 32.

The printer unit 200 includes a sensor group 351, and the sensor group 351 includes at least one sensor that monitors an operating state of a movable component that operates when the printer unit 200 performs an image forming process. The sensor group 351 performs a measurement operation in accordance with a request from the system control unit 30, and the condition information 354 obtained by measuring an operating state of a movable component is temporarily stored in a memory 353 by an information acquisition unit 352 after measurement. Subsequently, the condition information 354 is transmitted to the system control unit 30 and is also stored as the log data 323 into the storage apparatus 32.

Hardware Configuration of Server

Figure 5:
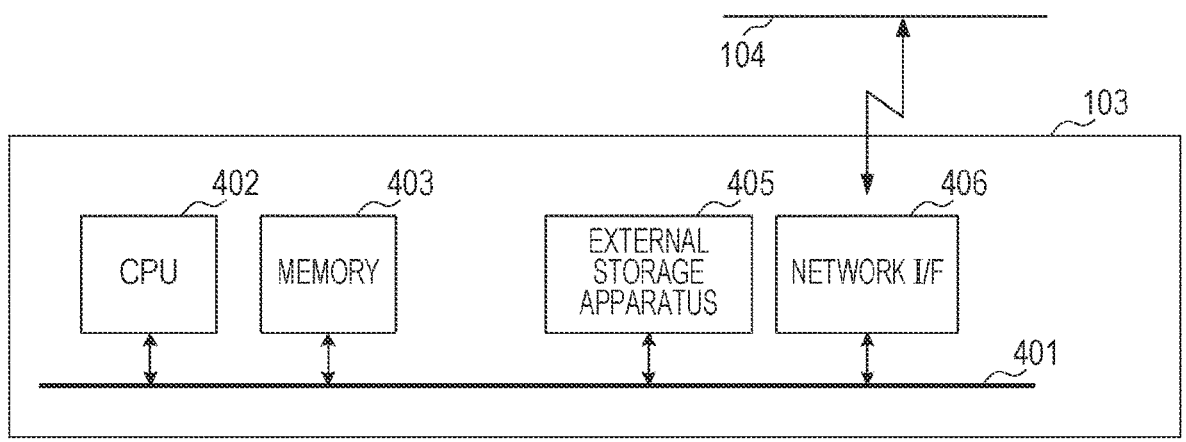
FIG. 5 illustrates a hardware configuration of a server according to one or more aspects of the present disclosure.

FIG. 5 illustrates an example of a hardware configuration of a control unit of the server 103. The server 103 includes a CPU 402, a memory 403, an external storage apparatus 405, and a network I/F 406 that are connected to a system bus 401.

The CPU 402 is a central processing unit that controls all operations. The memory 403 refers to nonvolatile and volatile memories and stores a boot program for the CPU 402 and data used in that program. The external storage apparatus 405 is a higher-capacity storage apparatus (for example, a hard disk drive (HDD)) than the memory 403. The external storage apparatus 405 stores a control program for the server 103 to be executed by the CPU 402, and data of the image forming apparatus 102 transmitted via the network 104. Incidentally, the external storage apparatus 405 may be, for example, a solid state drive (SSD) or may be replaced with another storage apparatus having a function equivalent to that of a hard disk drive.

At the time of start-up, such as when the power is turned on, the CPU 402 executes the boot program stored in the memory 403. This boot program is a program for reading the control program stored in the external storage apparatus 405 and loading the control program onto the memory 403. The CPU 402 executes the boot program and then executes the control program loaded onto the memory 403 to perform control.

Furthermore, the CPU 402 also stores data used during execution of the control program onto the memory 403 to read and write data. Onto the external storage apparatus 405, various settings necessary during execution of the control program can be further stored, and settings are read and written by the CPU 402. The CPU 402 communicates with other devices on the network 104 via the network I/F 406. For example, via the network I/F 406, data transmitted from the image forming apparatus 102 can be received, or maintenance information to be displayed on the console panel 31 can be transmitted.

Functional Configuration

Figure 6A:
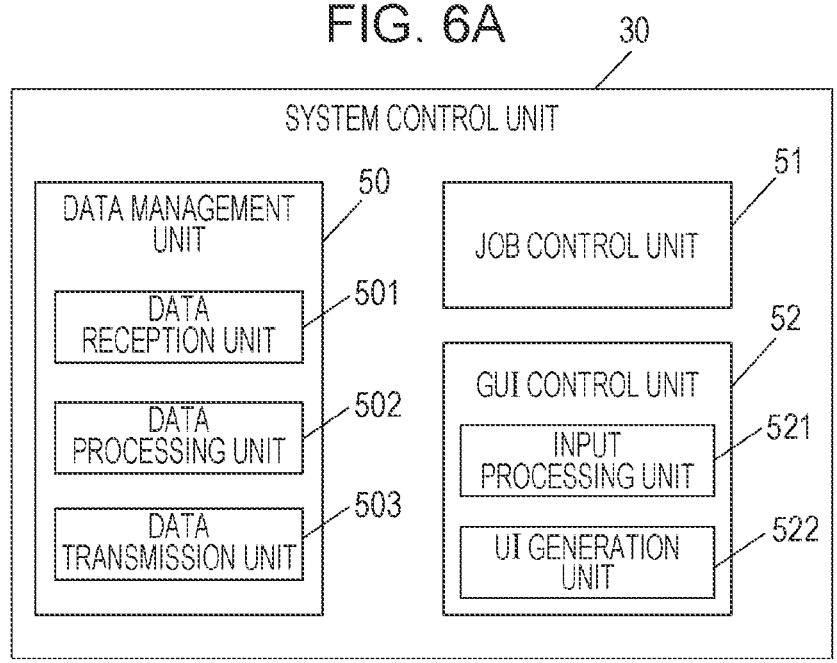
FIGS. 6A and 6B are conceptual diagrams each illustrating a functional configuration of a control program according to one or more aspects of the present disclosure.
Figure 6B:
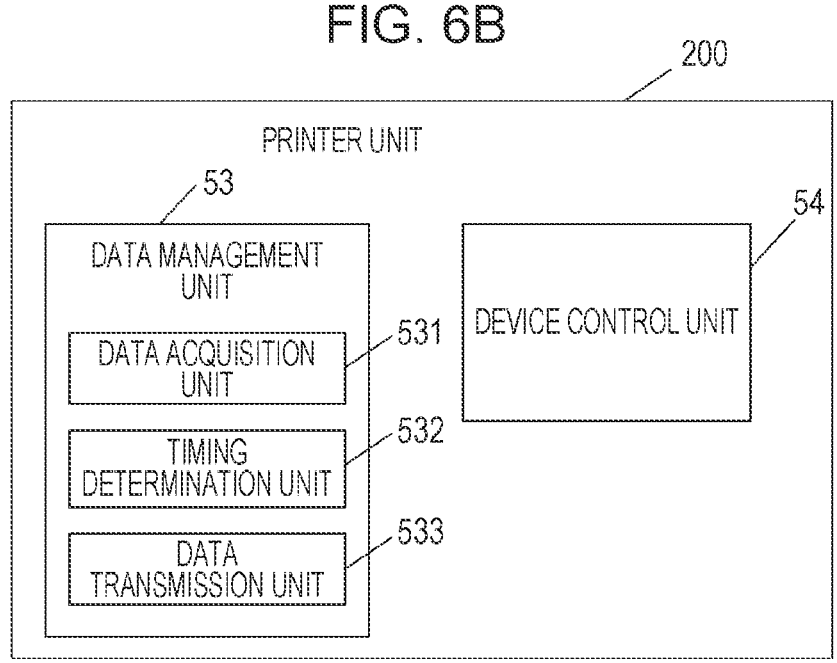

FIG. 6A illustrates a functional configuration of the system control unit 30, and FIG. 6B is a block diagram illustrating a functional configuration of the printer unit 200. Incidentally, although an example of the functional configuration of the printer unit 200 will be described, in a functional configuration of the reader unit 240, a device to be controlled by a device control unit 54 is the reading unit 249 or the reader image processing unit 247 in the reader unit. Furthermore, a sensor measurement value acquired by a data acquisition unit 531 is a measurement value obtained by the sensor group 341 included in the reader unit. Except for the above, the functional configuration of the reader unit 240 is similar to that of the printer unit 200, and thus a description thereof is omitted.

First, the functional configuration of the system control unit 30 illustrated in FIG. 6A will be described. In the system control unit 30, when the CPU 301 executes the program 321, the CPU 301 functions as a data management unit 50, a job control unit 51, and a GUI control unit 52.

The data management unit 50 is a processing unit that manages the condition information 354, such as sensor measurement values measured by various types of sensors incorporated into the image forming apparatus 102. The data management unit 50 includes a data reception unit 501, a data processing unit 502, and a data transmission unit 503. The data reception unit 501 communicates with the printer unit 200 via the data bus 34 and receives the condition information 354 obtained from the sensor group 351. Furthermore, the received condition information 354 is subjected to various types of processing for transmission to the server 103 by the data processing unit 502 and is transmitted to the server 103 by the data transmission unit 503 whenever necessary.

The job control unit 51 controls execution of a job in the image forming apparatus 102. The job control unit 51 communicates with the printer unit 200 and controls an operation to thereby control execution of a job designated by the user or the maintenance inspection person 105 input from the console panel 31.

The GUI control unit 52 controls input and output done through the console panel 31 in the image forming apparatus 102. Specifically, the GUI control unit 52 is composed of an input processing unit 521 that receives details input to the console panel 31 by the user or the maintenance inspection person 105, and a UI generation unit 522 that generates details to be displayed as a GUI on the console panel 31.

Next, the block diagram illustrating the functional configuration of the printer unit 200 in FIG. 6B will be described. In the printer unit 200, when the operation of the information acquisition unit 352 is set by the CPU 301, the printer unit 200 functions as a data management unit 53 and the device control unit 54. The data management unit 53 is a processing unit that manages a sensor value measured by the sensor group 351 incorporated into the printer unit 200.

The data acquisition unit 531 acquires a sensor value measured by the sensor group 351 when a timing determination unit 532 determines that it is a predetermined timing specified by a timer 350. Here, the above-described predetermined timing is set, for example, at fixed intervals of a few milliseconds to a few seconds measured by the timer 350. A data transmission unit 533 transmits, in accordance with a request from the system control unit 30, the condition information 354 acquired by the data acquisition unit 531 and also stores the condition information 354 as the log data 323 into the storage apparatus 32.

Here, an example of the condition information 354 acquired by the data acquisition unit 531 will be described with reference to FIG. 7. FIG. 7 illustrates an example of the condition information 354 of sensor measurement values acquired by the information acquisition unit 352 of the printer unit 200 from the sensor group 351. This condition information 354 is held in the memory 353.

On the memory 353, pieces of condition information 354 are sequentially stored for addresses 601 in the memory 353, and IDs 603 with which preassigned places where acquisition is performed in the sensor group 351 can be identified, pieces of sensor measurement value data 604, and pieces of timing information 602 about a point in time when a sensor measurement value has been acquired are registered. Thus, the timing when each piece of data has been acquired can be checked.

In this example, as of timing information of 0, a value of 680 degrees is recorded as an acquired result of a fixing unit temperature (ID=0) of the fixing unit 211, and 2013 rpm is recorded as an acquired result of a belt motor rotational speed (ID=1) of the intermediate transfer belt 206. Furthermore, 3.5 m is also recorded as an acquired result of a distance a roller of the transfer cleaner 210 has moved (ID=2). For a toner density sensor value (ID=3), 980 is recorded as a density value obtained by quantizing a voltage acquired by the density detection sensor 220 into 10 bits (0 to 1023). Furthermore, as the timing information proceeds to rows of 1, 2, etc., acquisition timings are assigned, and sensor measurement values at respective timings are recorded. Pieces of data stored on this memory are transmitted one after another in accordance with a request from the system control unit 30.

Entire Operation Flow

Figure 8:
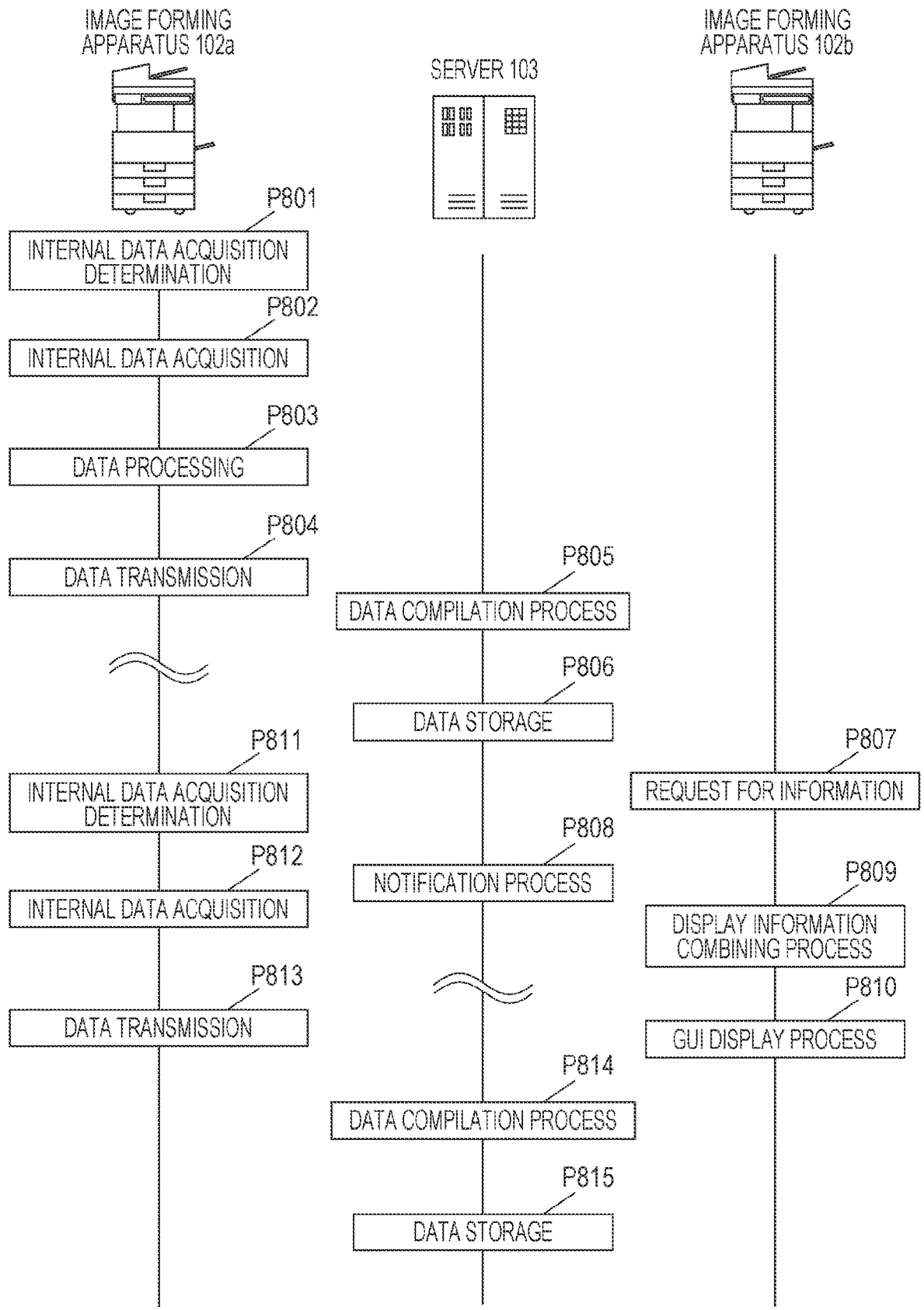
FIG. 8 is a conceptual diagram illustrating a process flow performed in the entire system according to one or more aspects of the present disclosure.

FIG. 8 illustrates an overview of an operation flow performed in the entire management system 10. Processes included in the present operation flow will be described in detail later separately.

Although an example will be described in which the condition information 354 is acquired from the printer unit 200, even in the case of the reader unit 240, the format of held sensor measurement values is similar to that in the printer unit 200, and only specific details of sensors differ from those in the printer unit 200.

First, an image forming apparatus 102*a* performs an internal data acquisition determination by using a control program for the timing determination unit 532 in response to the timer 350 of the printer unit 200 (process P801). When the image forming apparatus 102*a* determines that it is the timing, the image forming apparatus 102*a* acquires the condition information 354, such as sensor measurement values, by using a control program for the data acquisition unit 531 and stores the condition information 354 as the log data 323 into the storage apparatus 32 (process P802). When a sufficient amount of condition information 354 is accumulated, the condition information 354 is transmitted to the system control unit 30 by a control program for the data transmission unit 533 and then is subjected to data processing for transmission to the server 103 by a program for the data processing unit 502 (process P803).

Figure 9:
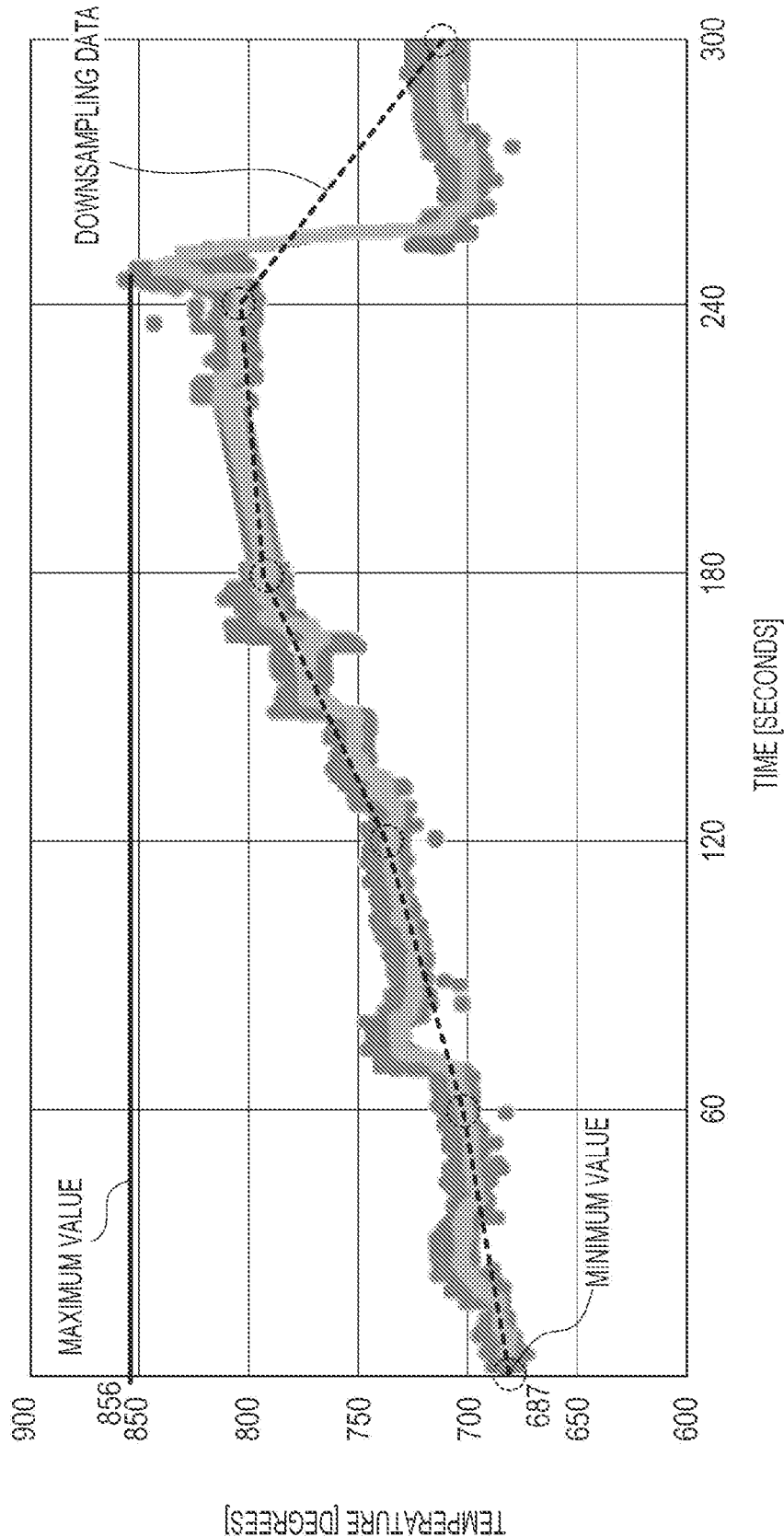
FIG. 9 illustrates an example of data measured in one or more aspects of the present disclosure.

This process is performed because the condition information 354 is too large to serve as data to be transmitted to the server 103. For example, when time-series data of fixing unit temperatures of the fixing unit 211 is acquired as the condition information 354 as illustrated in FIG. 9, the condition information 354 is processed into a maximum value of 856 degrees, a minimum value of 687 degrees, and data subjected to downsampling every minute.

The processed data is transmitted to the server 103 by the data transmission unit 503 via the network 104 (process P804).

Subsequently, when the image forming apparatus 102*a* again determines that it is the internal data acquisition timing (process P811), the image forming apparatus 102*a* repeatedly performs a series of operations of again acquiring and processing the condition information 354 (process P812) and transmitting the processed data to the server 103 (process P813).

When the server 103 receives the condition information 354 from the image forming apparatus 102*a*, the server 103 first performs a data compilation and statistical process (process P805).

Here, the maximum value, the minimum value, and the data subjected to downsampling that have been calculated in P803 are compiled together with pieces of data of the plurality of image forming apparatuses 102 and past compiled statistical information stored in the external storage apparatus 405, and thus information representing a typical operation condition is calculated.

Then, the calculated data is finally stored into the external storage apparatus 405 (process P806).

Subsequently, when data is transmitted again, the server 103 similarly repeatedly performs a series of operations of performing the data compilation and statistical process (process P814) and storing and managing calculated data (process P815).

On the other hand, in an image forming apparatus 102*b*, to display information related to maintenance information selected by the user or the maintenance inspection person 105 operating the console panel 31, a request for information transfer is issued to the server 103 (process P807).

In response to this, the server 103 selects related information from among compiled statistical information calculated from pieces of data of the plurality of image forming apparatuses 102 and stored in the external storage apparatus 405 in process P806 and notifies the image forming apparatus 102*b* of the related information (process P808).

In the image forming apparatus 102*b* that has received this notification, pieces of information to be displayed as a GUI are combined from the compiled statistical information received from the server 103 and internal log data 323 of its own machine (process P809). Subsequently, a display is provided on the console panel 31 so that the user or the maintenance inspection person 105 can read information (process P810).

Process Flow

Next, an example of a specific process performed in the image forming apparatus 102 described above will be described.

Figure 10:
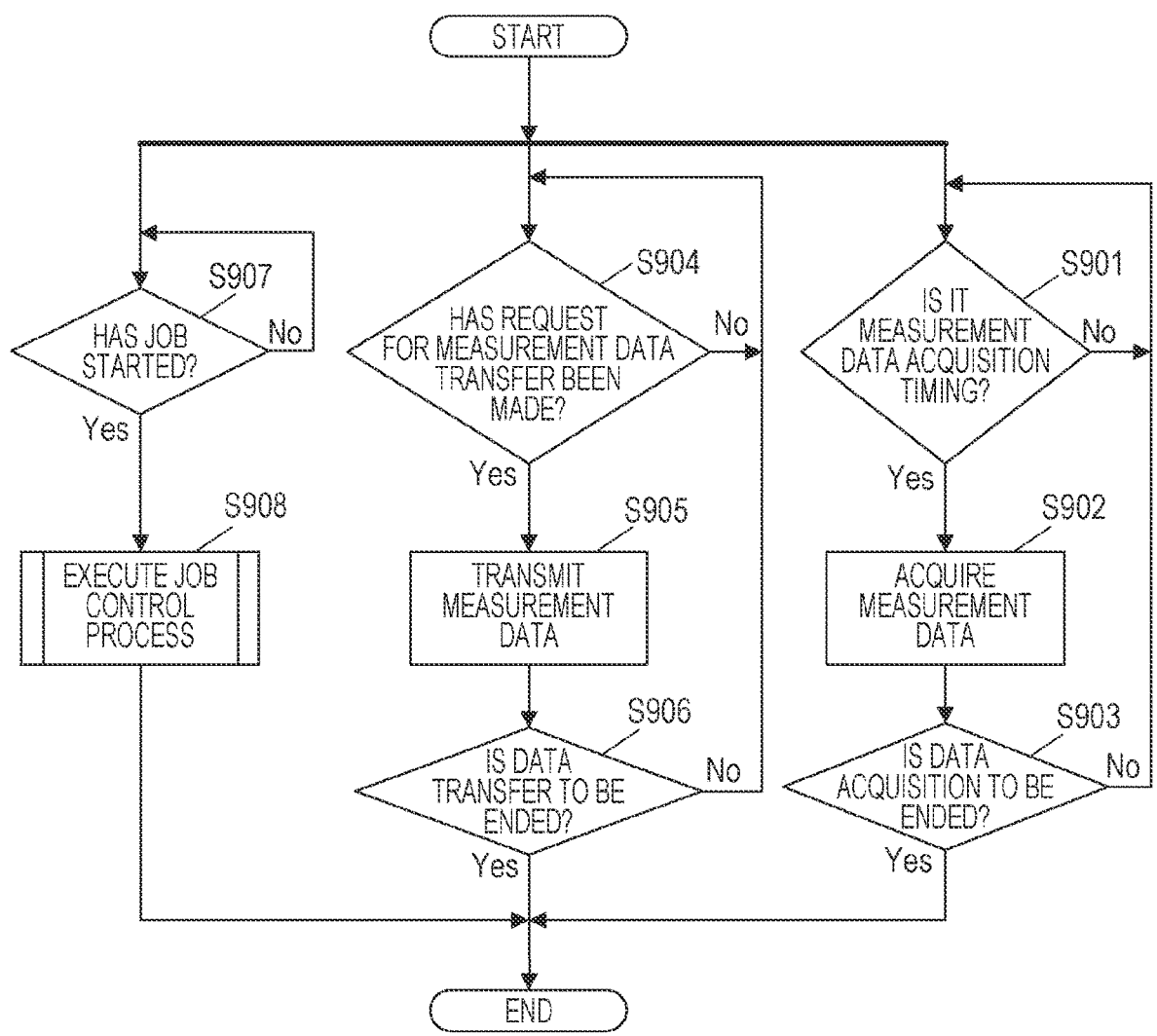
FIG. 10 is a flowchart illustrating an example of a process flow performed by a reader unit or a printer unit according to one or more aspects of the present disclosure.

First, FIG. 10 is a flowchart illustrating an example of a processing procedure performed in the printer unit 200 in the image forming apparatus 102. Incidentally, although an example of the flowchart performed by the printer unit 200 will be described, a process similar to this is performed by the reader unit 240 as well, and only the type of data dealt with differs from that dealt with by the printer unit 200. Thus, a description of the similar process is omitted.

First, the printer unit 200 waits for a print job to be started (step S907).

A job control process is executed by the user or the maintenance inspection person 105 operating the console panel 31 to provide an instruction to execute a job. When this is executed, the printer unit 200 primarily controls devices involved in image formation, such as photosensitive members 201, exposure devices 203, and development devices 204 that are included in the printer unit 200, to execute a print operation (step S908).

At the same time, the information acquisition unit 352 determines whether or not it is an acquisition timing to acquire a sensor measurement value (step S901). In this example, this acquisition timing is set at fixed intervals of a few milliseconds to a few seconds measured by the timer 350 as described above.

When it is the predetermined timing, the information acquisition unit 352 acquires a sensor measurement value from the sensor group 351 (step S902).

Values acquired here are those described above and illustrated in FIG. 7 and are stored, into the memory 353, as IDs 603 with which places where acquisition is performed can be identified, pieces of sensor measurement value data 604, and pieces of timing information 602 about a point in time when a sensor measurement value has been acquired.

Next, it is determined whether to end acquisition (step S903). Here, an instruction to stop data acquisition may be provided upon termination of the job in accordance with an instruction from the CPU 301, or alternatively, data acquisition may be ended at a point in time preset by the user or the maintenance inspection person 105.

In parallel with the above-described data acquisition flow, data transfer is performed. First, it is determined whether or not a request for data transfer from the CPU 301 has been made (step S904). When the request is made, the condition information 354 stored on the memory 353 is transmitted to the system control unit 30 and is also stored as the log data 323 into the storage apparatus 32 (step S905). The transmission to the system control unit 30 is performed by the CPU 301 accessing the condition information 354 on the memory 353.

Finally, when data acquisition is ended and transfer of all data on the memory 353 is finished, data transfer is ended (step S906).

Figure 11:
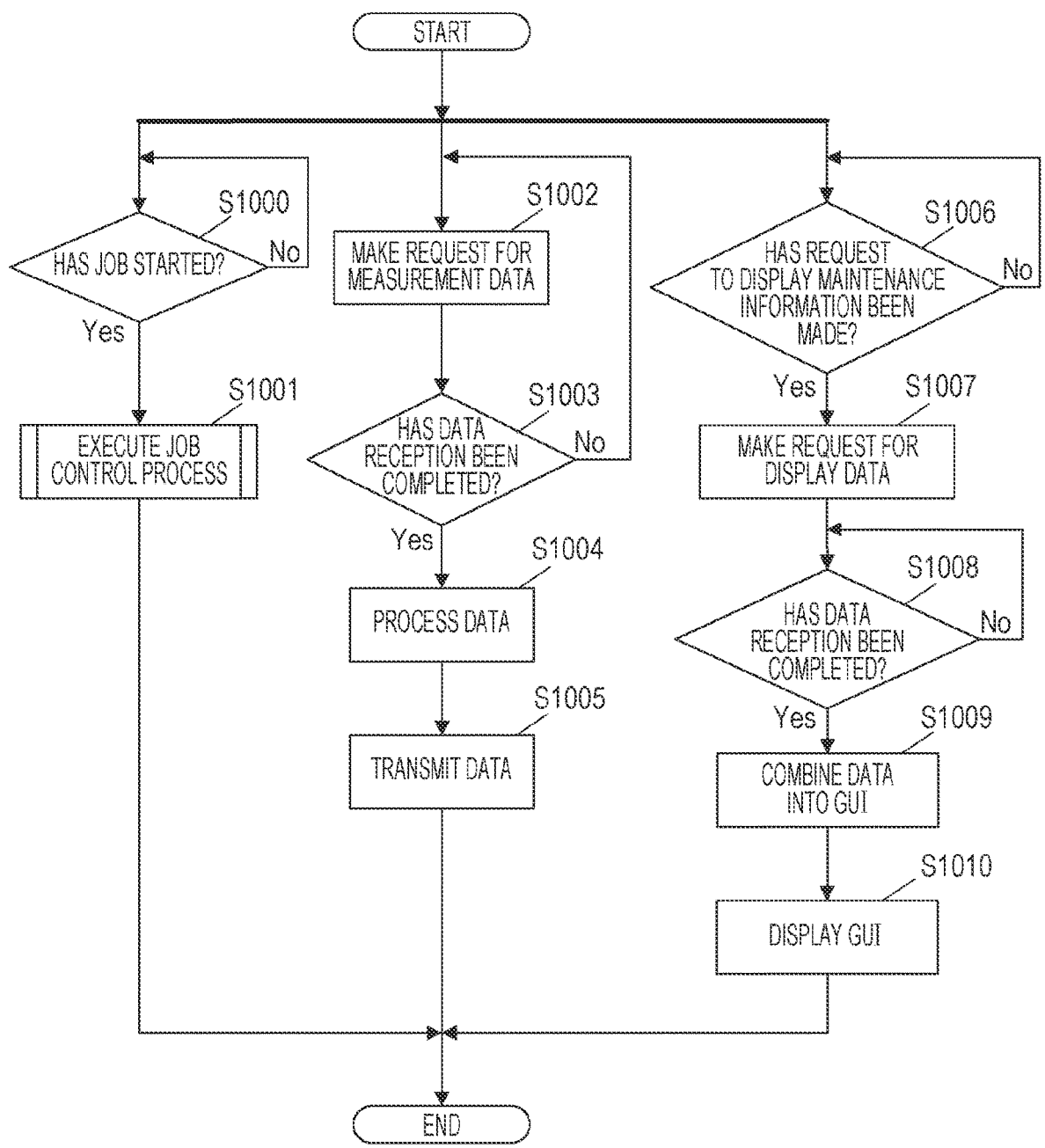
FIG. 11 is a flowchart illustrating an example of a process flow performed by a system control unit according to one or more aspects of the present disclosure.

Next, FIG. 11 is a flowchart illustrating an example of a processing procedure performed in the system control unit 30. The present process is a process that is started by the CPU 301 of the system control unit 30 executing the program 321.

First, the system control unit 30 waits for a print job to be executed (step S1000).

This is a state in which the system control unit 30 waits for an instruction to execute the job to be provided by the user or the maintenance inspection person 105 operating the above-described console panel 31. When the job is started, control is performed from the system control unit 30 so that the reader unit 240 and the printer unit 200 start scan job control and print job control involving image formation, respectively (step S1001).

At the same time, the CPU 301 accesses the memory 353 and the memory 343 so that the condition information 354 and the condition information 344 are transferred from the printer unit 200 and the reader unit 240 (step S1002).

Next, the CPU 301 determines whether or not reception of all data has been completed (step S1003). Until, in the printer unit 200 and the reader unit 240, the respective jobs are finished and all the held condition information 354 and condition information 344 are transferred, step S1002 and step S1003 are repeated, and the flow proceeds to step S1004 when all transfer is finished.

The collected condition information 344 and condition information 354 are processed for transmission to the server 103. As described above, this data processing is to calculate a maximum value, a minimum value, and data subjected to downsampling from the condition information 344 and the condition information 354 by using the data processing unit 502 (step S1004).

Finally, the CPU 301 transmits the processed data to the server 103 and ends the flow (step S1005). Furthermore, in parallel with this operation, the CPU 301 waits for a request to display maintenance information to be made (step S1006).

Figure 12:
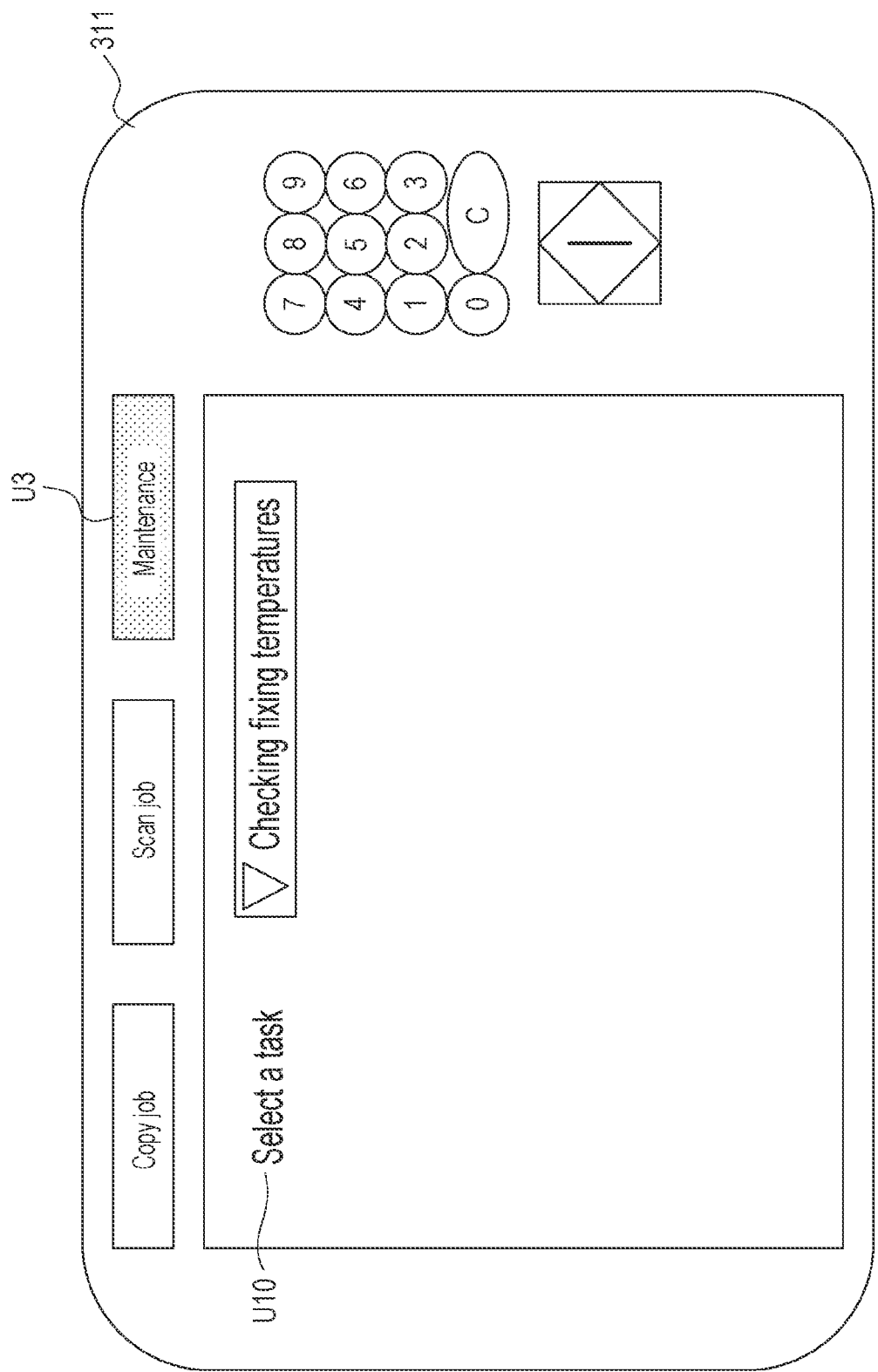
FIG. 12 illustrates an example displayed on the console panel according to one or more aspects of the present disclosure.

For such an instruction, the user or the maintenance inspection person 105 operates the console panel 31 and touches a touch panel key U3 illustrated in FIG. 12 to provide an instruction to display maintenance information, and the user or the maintenance inspection person 105 is prompted to select information necessary for maintenance by using a touch panel key U10. In this example, a task of checking fixing temperatures is selected, and a request for compiled statistical information for checking fixing temperatures is made to the server 103 (step S1007).

Next, the CPU 301 waits until the CPU 301 receives the compiled statistical information from the server 103 (step S1008).

Figure 13:
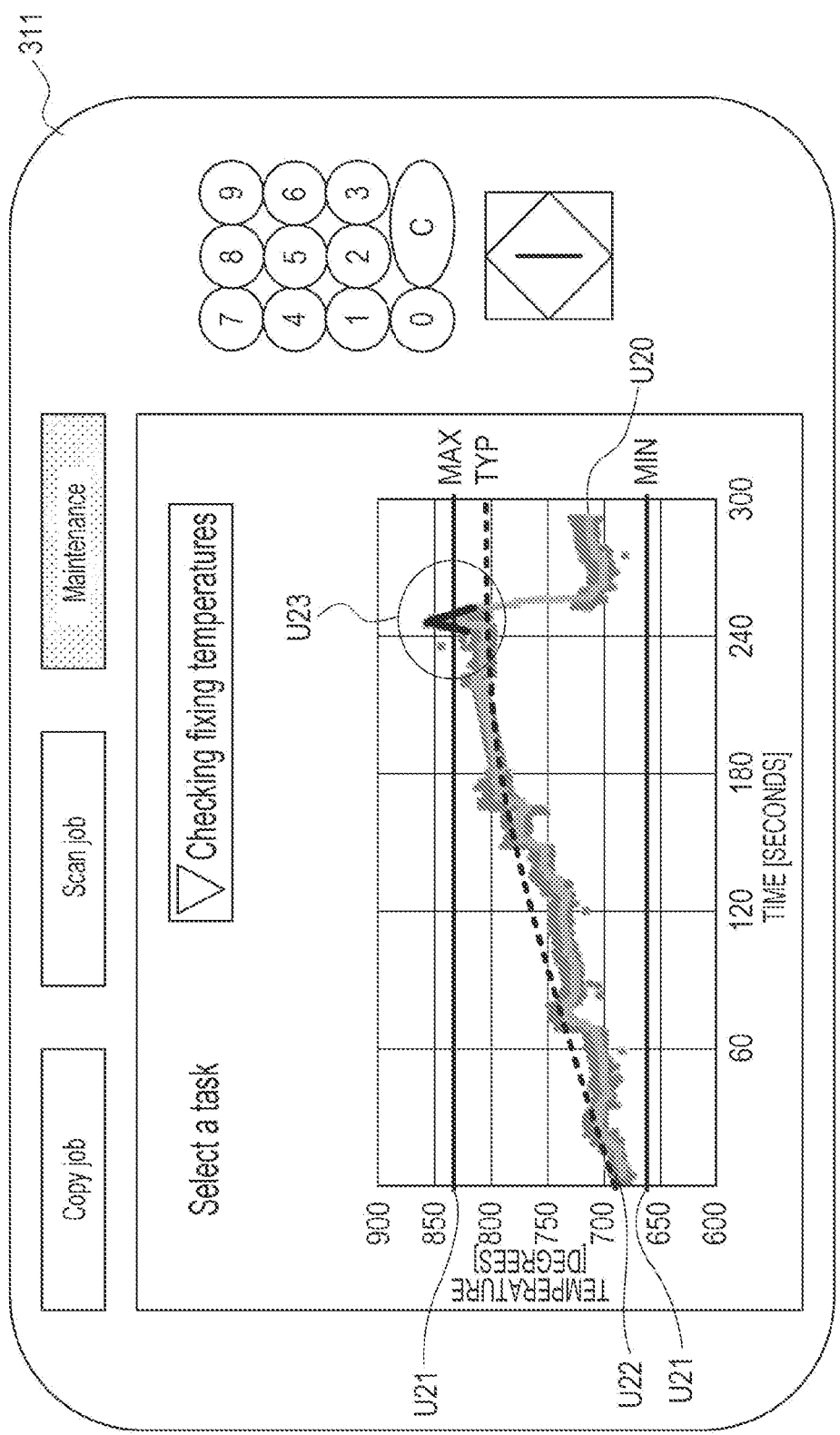
FIG. 13 illustrates an example displayed on the console panel according to one or more aspects of the present disclosure.

When the compiled statistical information is received from the server 103, as illustrated in FIG. 13, the log data 323 stored in the storage apparatus 32 is condition information U20 of its own machine. Furthermore, among the compiled statistical information received from the server 103, an average maximum/minimum value is denoted by U21, and a typical fixing temperature transition is denoted by U22. They are graphed on a time-series basis and combined to be displayed as a GUI. Furthermore, when machine learning data for determination of an anomaly is received from the server 103, a point U23 detected as an anomaly in the condition information U20 of the own machine may also be displayed (step S1009). Subsequently, the GUI is finally displayed on the display unit 311 of the console panel 31 (step S1010).

Thus, data calculated from pieces of condition information of a plurality of image forming apparatuses transmitted to a management apparatus, and condition information stored in a storage unit can be displayed on the same screen. Furthermore, a threshold value of a normal operation range calculated from the pieces of condition information of the plurality of image forming apparatuses can also be displayed.

Consequently, the user or the maintenance inspection person 105 who has operated the console panel 31 can obtain details on maintenance and thus can find and deal with an issue early.

Figure 14:
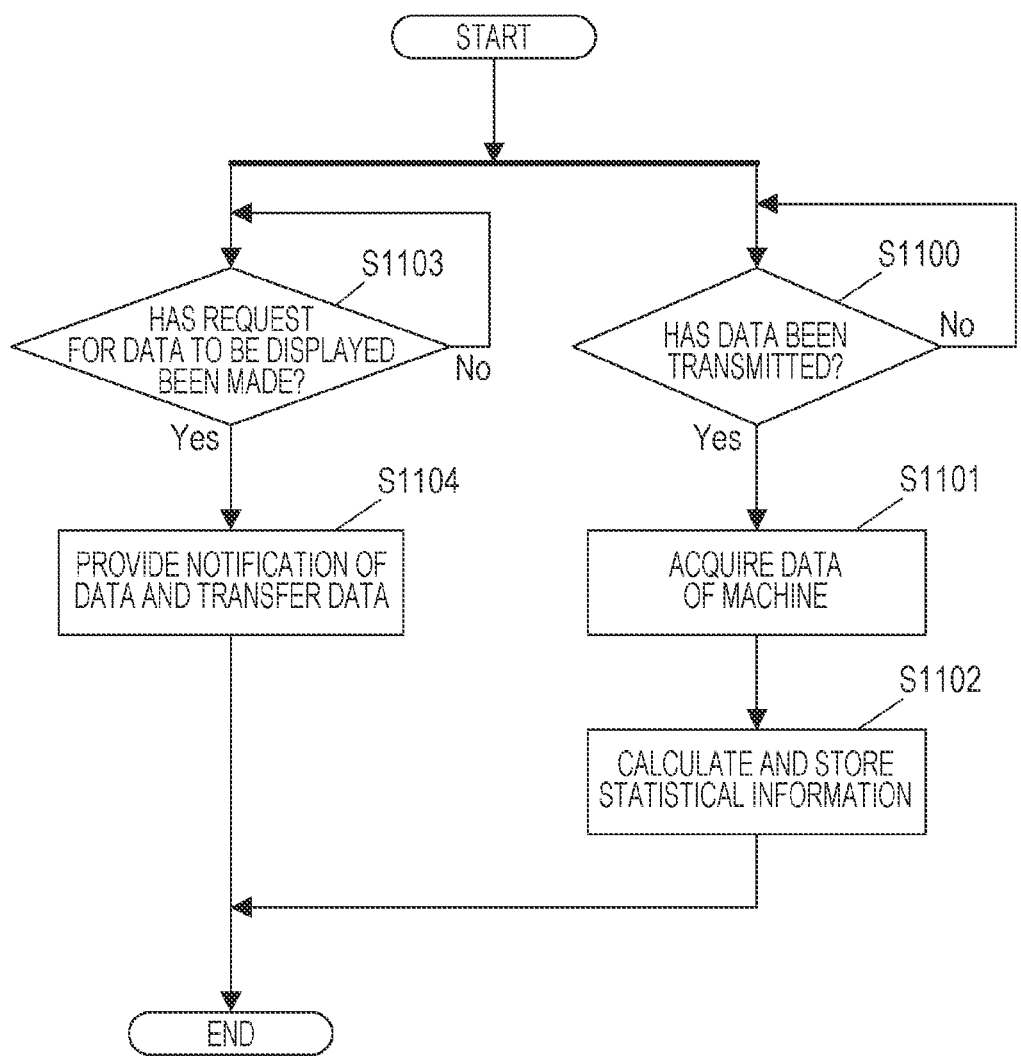
FIG. 14 is a flowchart illustrating an example of a process flow performed by the server according to one or more aspects of the present disclosure.

Next, FIG. 14 is a flowchart illustrating an example of a process performed by the server 103.

First, the server 103 waits for processed data to be transmitted from the image forming apparatus 102 (step S1100).

When the processed data is transmitted, the server 103 proceeds to step S1101 and acquires data of each of machines. Next, the server 103 calculates, from the acquired data, and compiled statistical information calculated in the past and stored in the external storage apparatus 405, a new average maximum/minimum value U21, and data U22 representing a typical operation condition, for example. Subsequently, the server 103 stores the new calculated compiled statistical information into the external storage apparatus 405 (step S1102).

At the same time, when a request for data to be displayed as a GUI is made from the image forming apparatus 102 (step S1103), the server 103 reads, from among the compiled statistical information stored into the external storage apparatus 405 in step S1102, data matching the request and transmits the data. This data includes the average maximum/minimum value U21 and the data U22 representing the typical operation condition that have been calculated from pieces of information of the above-described machines, and machine learning data for determination of an anomaly held in advance by the server 103 (step S1104).

When the above-described configurations and processes in this practical example are employed, a system can be provided in which, for example, failures or the lives of various components installed in an image forming apparatus can be checked from a console panel and that facilitates understanding of the condition of the machine and enables analysis to be performed with ease even if an anomaly occurs.

PRACTICAL EXAMPLE 2

In Practical Example 2, an example will be given where, in a case where the maintenance inspection person 105 replaces an internal part of the image forming apparatus 102, a GUI useful in determining whether proper replacement has been made after the replacement is provided. A system configuration in this example is similar to that in Practical Example 1, and this example differs from Practical Example 1 only in process details. Thus, a description of the system configuration is omitted, and a process flow will be described.

Figure 15:
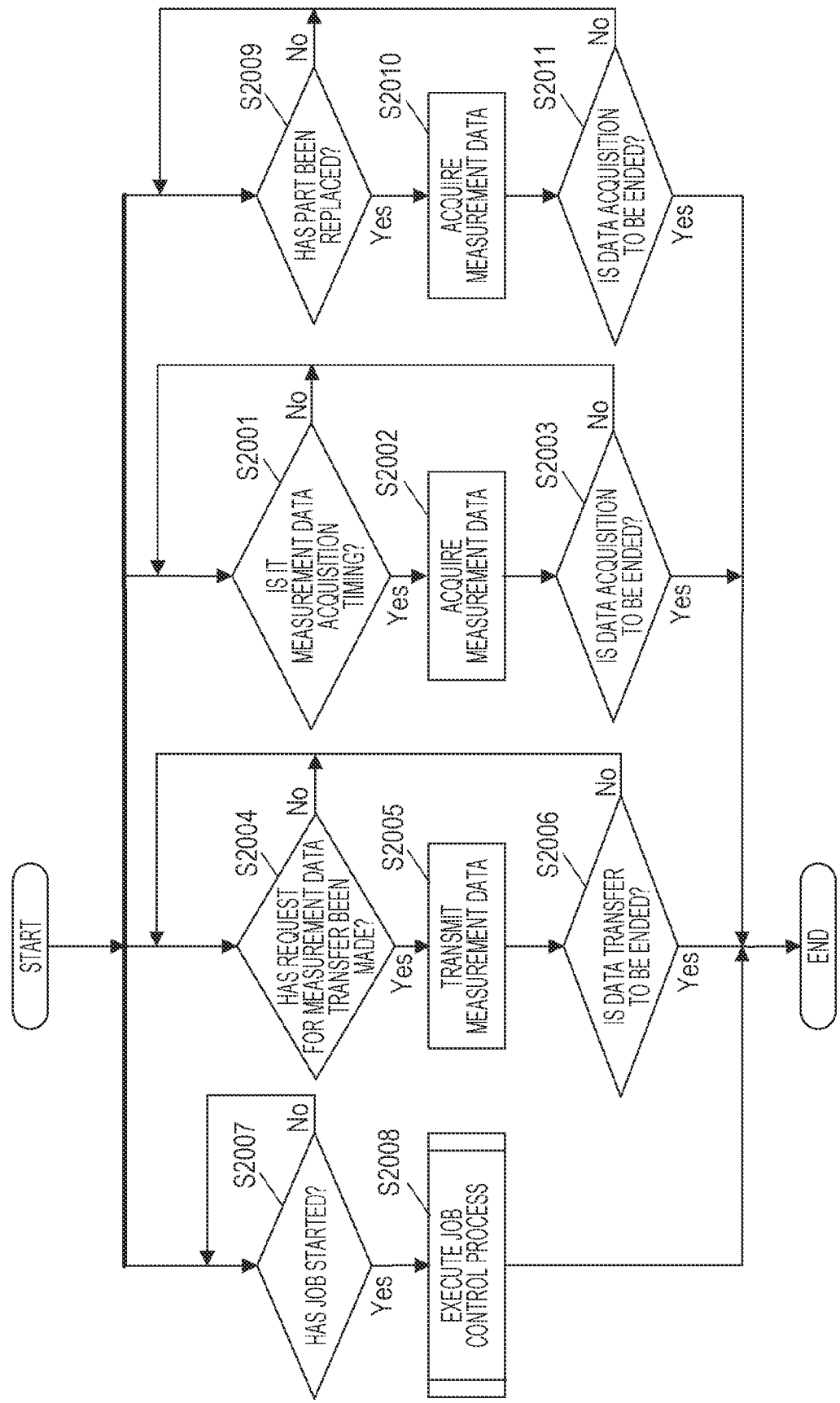
FIG. 15 is a flowchart illustrating an example of a process flow performed by the reader unit or the printer unit according to one or more aspects of the present disclosure.

FIG. 15 illustrates an example of a processing procedure performed in the printer unit 200 in the image forming apparatus 102. Incidentally, although an example of a flowchart performed by the printer unit 200 will be described, a process similar to this is performed by the reader unit 240 as well, and only the type of data dealt with differs from that dealt with by the printer unit 200. Thus, a description of the similar process is omitted.

First, the printer unit 200 waits for a print job to be started (step S2007).

A job control process is executed by the user or the maintenance inspection person 105 operating the console panel 31 to provide an instruction to execute a job. When this is executed, the printer unit 200 primarily controls devices involved in image formation, such as photosensitive members 201, exposure devices 203, and development devices 204 that are included in the printer unit 200, to execute a print operation (step S2008).

At the same time, the information acquisition unit 352 determines whether or not it is an acquisition timing to acquire a sensor measurement value (step S2001). In this example, this acquisition timing is set at fixed intervals of a few milliseconds to a few seconds measured by the timer 350 as described above.

When it is the predetermined timing, the information acquisition unit 352 acquires a sensor measurement value from the sensor group 351 (step S2002).

Values acquired here are those described above and illustrated in FIG. 7 and are stored, into the memory 353, as IDs 603 with which places where acquisition is performed can be identified, pieces of sensor measurement value data 604, and pieces of timing information 602 about a point in time when a sensor measurement value has been acquired.

Next, it is determined whether to end acquisition (step S2003). Here, an instruction to stop data acquisition may be provided upon termination of the job in accordance with an instruction from the CPU 301, or alternatively, data acquisition may be ended at a point in time preset by the user or the maintenance inspection person 105.

When it is the predetermined timing, the information acquisition unit 352 acquires a sensor measurement value from the sensor group 351 (step S2002).

Values acquired here are those described above and illustrated in FIG. 7 and are stored, into the memory 353, as IDs 603 with which places where acquisition is performed can be identified, pieces of sensor measurement value data 604, and pieces of timing information 602 about a point in time when a sensor measurement value has been acquired.

Next, it is determined whether to end acquisition (step S2003). Here, an instruction to stop data acquisition may be provided upon termination of the job in accordance with an instruction from the CPU 301, or alternatively, data acquisition may be ended at a point in time preset by the user or the maintenance inspection person 105.

In parallel with the above-described data acquisition flow, data transfer is performed. First, it is determined whether or not a request for data transfer from the CPU 301 has been made (step S2004). When the request is made, the condition information 354 stored on the memory 353 is transmitted to the system control unit 30 and is also stored as the log data 323 into the storage apparatus 32 (step S2005). The transmission to the system control unit 30 is performed by the CPU 301 accessing the condition information 354 on the memory 353.

Finally, when data acquisition is ended and transfer of all data on the memory 353 is finished, data transfer is ended (step S2006).

Furthermore, in parallel with the above-described data acquisition and data transmission flows, the information acquisition unit 352 determines whether or not a part has been replaced (step S2009).

Figure 16:
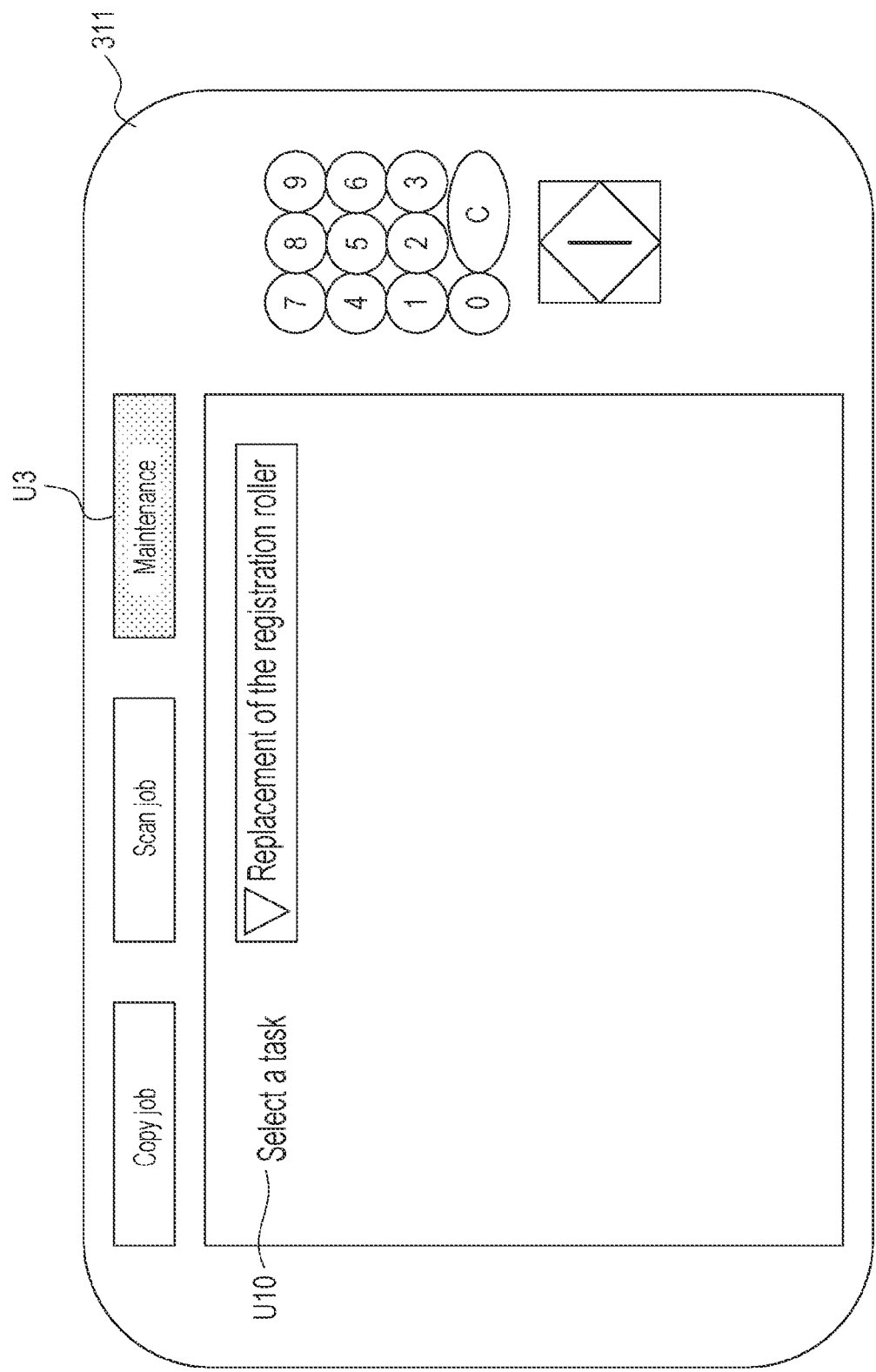
FIG. 16 illustrates an example displayed on the console panel according to one or more aspects of the present disclosure.

Here, the user or the maintenance inspection person 105 operates the console panel 31 and touches the touch panel key U10 illustrated in FIG. 16 to provide notification that a part has been replaced, and thus it is determined that the part has been replaced. In this example, the registration roller 232 has been replaced, and thus replacement of the registration roller is selected for the touch panel key U10.

When the part is replaced, the information acquisition unit 352 acquires the condition information 354 from the sensor group 351 (step S2010).

Values acquired here are similar to those described above and illustrated in FIG. 7. At least measurement value data including information on a replacement part, at least part replacement timing information, and at least part anomaly occurrence timing information for a case where an error has occurred are stored into the memory 353.

Next, it is determined whether to end acquisition (step S2011). Here, data acquisition may be continued until the job is executed only for a predetermined number of pages, or alternatively, data acquisition may be ended at a point in time preset by the user or the maintenance inspection person 105.

Next, an example of a processing procedure performed in the system control unit 30 is similar to that illustrated in FIG. 11, and thus a description thereof will be given with reference to FIG. 11. The present process is a process that is started by the CPU 301 of the system control unit 30 executing the program 321.

First, the system control unit 30 waits for a print job to be executed (step S1000).

This is a state in which the system control unit 30 waits for an instruction to execute the job to be provided by the user or the maintenance inspection person 105 operating the above-described console panel 31. When the job is started, control is performed from the system control unit 30 so that the reader unit 240 and the printer unit 200 start scan job control of image scanning and print job control involving image formation, respectively (step S1001).

At the same time, the CPU 301 accesses the memory 353 and the memory 343 so that the condition information 354 and the condition information 344 are transferred from the printer unit 200 and the reader unit 240 (step S1002).

Next, the CPU 301 determines whether or not reception of all data has been completed (step S1003). Until, in the printer unit 200 and the reader unit 240, the respective jobs are finished and all the held condition information 354 and condition information 344 are transferred, step S1002 and step S1003 are repeated, and the flow proceeds to step S1004 when all transfer is finished.

Figure 17:
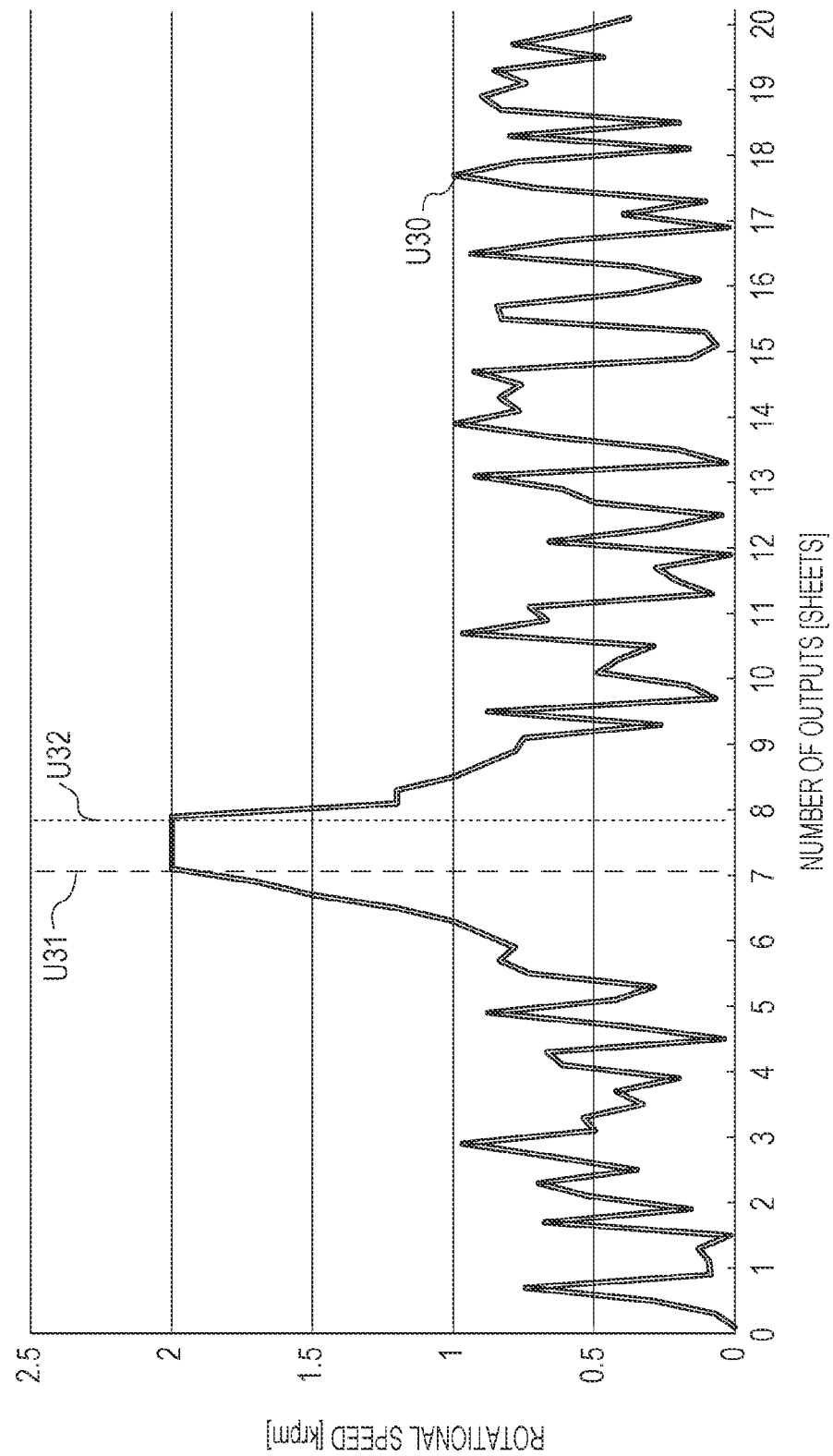
FIG. 17 illustrates an example of data measured in one or more aspects of the present disclosure.

The collected condition information 344 and condition information 354 are processed for transmission to the server 103. As described above, this data processing is to calculate a maximum value, a minimum value, and data subjected to downsampling from the condition information 344 and the condition information 354 by using the data processing unit 502. Furthermore, in a case where part replacement has occurred, there is provided additional information, such as registration roller rotational speed information U30 of a replacement registration roller 232, as illustrated in FIG. 17. Furthermore, there are also provided additional information, such as a part anomaly occurrence timing U31 for a case where an error has occurred, and a part replacement timing U32 from which a point in time when part replacement has been made can be found (step S1004).

Finally, the CPU 301 transmits the processed data to the server 103 and ends the flow (step S1005).

Furthermore, in parallel with this operation, the CPU 301 waits for a request to display maintenance information to be made (step S1006).

Figure 18:
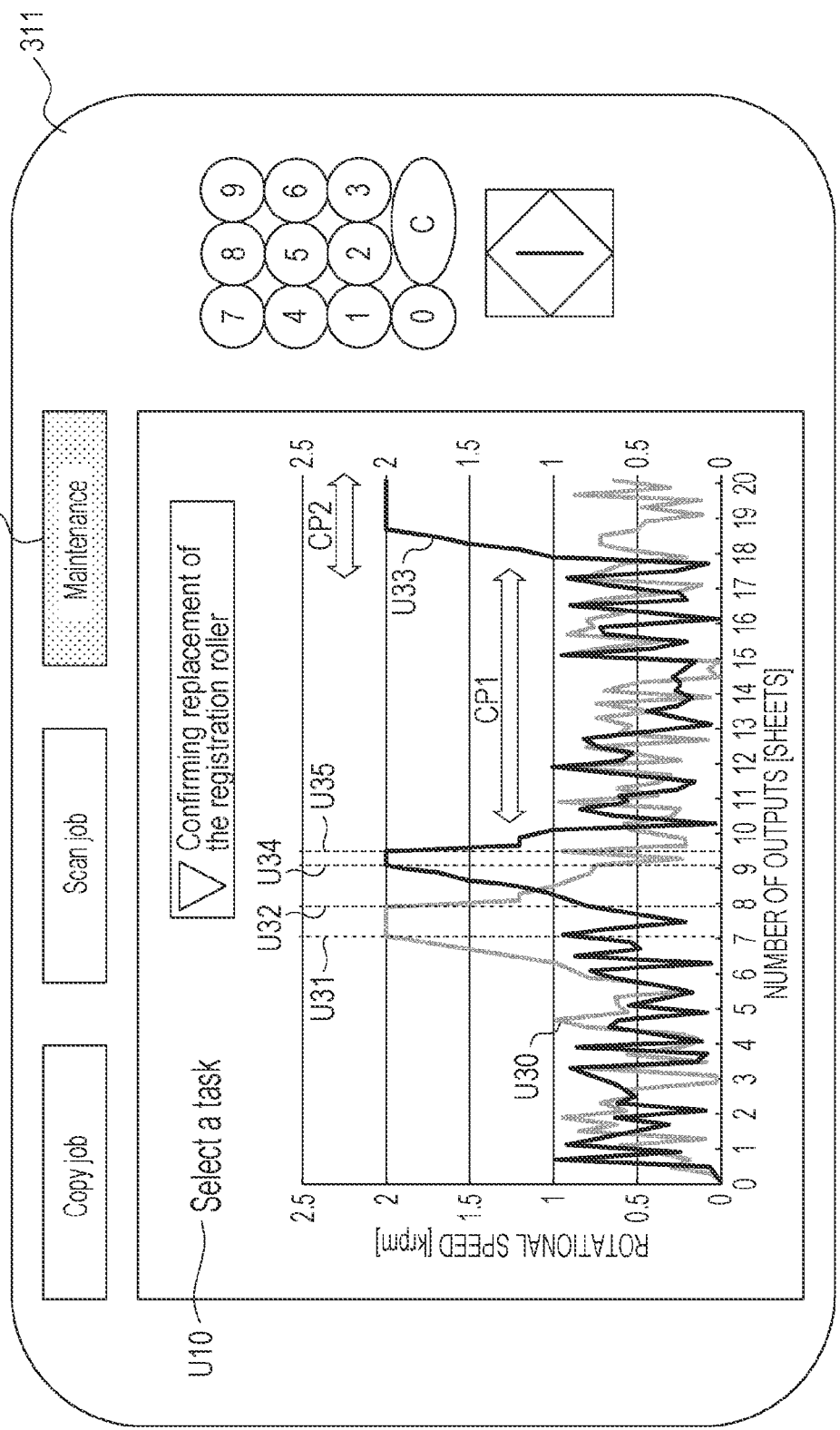
FIG. 18 illustrates an example displayed on the console panel according to one or more aspects of the present disclosure.

For such an instruction, the user or the maintenance inspection person 105 operates the console panel 31 and touches the touch panel key U10 illustrated in FIG. 18 to provide an instruction to display maintenance information. In this example of FIG. 18, a task of confirming replacement of the registration roller is selected, and a request for compiled statistical information for confirming replacement of the registration roller is made to the server 103 (step S1007).

Next, the CPU 301 waits until the CPU 301 receives the compiled statistical information from the server 103 (step S1008).

When the compiled statistical information is received from the server 103, as illustrated in FIG. 18, a part anomaly occurrence timing U34 of the registration roller and a part replacement timing U35 of the registration roller that are included in the log data 323 stored in the storage apparatus 32 are graphed on a time-series basis to be displayed as a GUI. Furthermore, registration roller rotational speed information U33 of its own machine, and the part anomaly occurrence timing U31 of the registration roller, the part replacement timing U32 of the registration roller, and the registration roller rotational speed information U30 that have been received from the server 103 are also graphed and combined (step S1009).

Subsequently, the GUI is finally displayed on the display unit 311 of the console panel 31 (step S1010).

Thus, for example, looking at the fact that the registration roller rotational speed information U30 after the part replacement timing U32 is in a stable transition state and that the registration roller rotational speed information U33 after the part replacement timing U35 is in a transition state in which a divergence has occurred, the following determination can be made. In other words, in the example of FIG. 18, a value of the registration roller rotational speed information U33 increases again after a certain period of time, and thus it can be determined that the registration roller rotational speed information U33 is not in a normal state and that replacement work has not been carried out successfully.

As described above, the maintenance inspection person 105 having operated the console panel 31 can obtain information on a behavior exhibited after proper part replacement has been made that can be compared with a behavior exhibited after the maintenance inspection person 105 has made part replacement, and thus it can be determined accurately whether the part replacement made by the maintenance inspection person 105 itself is proper.

Figure 19:
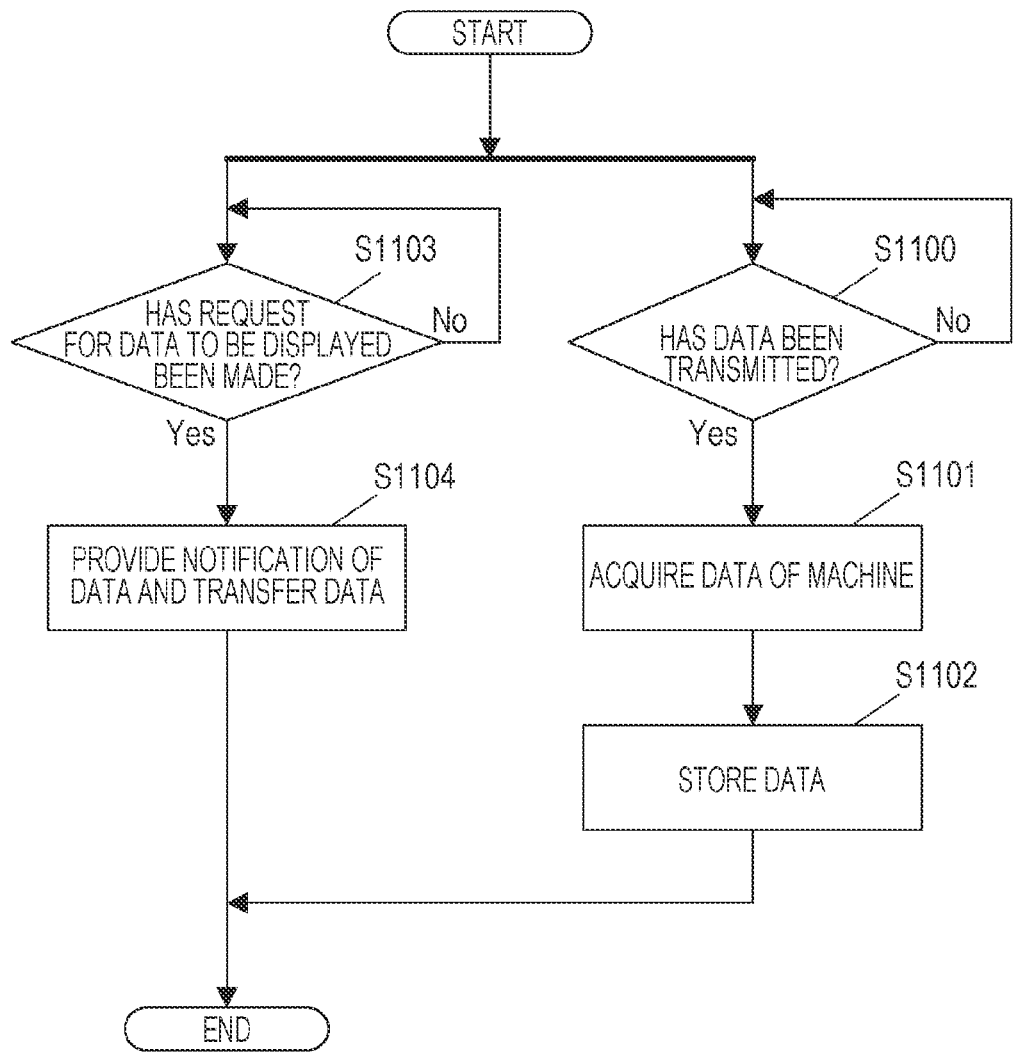
FIG. 19 is a flowchart illustrating an example of a process flow performed by the server according to one or more aspects of the present disclosure.

Next, FIG. 19 is a flowchart illustrating an example of a process performed by the server 103.

First, the server 103 waits for processed data to be transmitted from the image forming apparatus 102 (step S1100).

When the processed data is transmitted, the server 103 proceeds to step S1101 and acquires data of each of machines. Next, the server 103 stores the acquired data (step S1102).

At the same time, when a request for data to be displayed as a GUI is made from the image forming apparatus 102 (step S1103), the server 103 selects, from among the data stored in step S1102, data matching the request and transmits the data. This data includes, as described above, measurement value data including information on a replacement part, part replacement timing data, and part anomaly occurrence timing data (step S1104).

Thus, information on component replacement identified based on pieces of condition information of a plurality of image forming apparatuses can be displayed.

When the above-described configurations and processes in this practical example are employed, a system can be provided that facilitates understanding of the condition of a machine in which replacement has been made even when various components installed in the image forming apparatus are replaced and that enables analysis to be performed with ease even if an anomaly occurs.

The present disclosure can provide a system that facilitates understanding of the condition of a machine by a person in charge of maintenance and that enables analysis to be performed with ease even if an anomaly occurs.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-172944 filed Oct. 22, 2021, which is hereby incorporated by reference herein in its entirety.

What is claimed is:

1. A management system including a plurality of image forming apparatuses and a management apparatus connectable to the plurality of image forming apparatuses via a network, the management system comprising:
   a detection unit configured to detect a condition of each image forming apparatus;
   a storage unit configured to store condition information acquired by the detection unit detecting the condition;
   a transmission unit configured to transmit the condition information stored in the storage unit to the management apparatus; and
   a display unit configured to display information,
   wherein the display unit displays, on a same screen, data based on pieces of condition information of the plurality of image forming apparatuses transmitted to the management apparatus, and data based on the condition information stored in the storage unit,
   wherein the condition information is information based on an operating state of the image forming apparatus.

2. The management system according to claim 1, wherein the display unit displays a threshold value of a normal operation range identified based on the pieces of condition information of the plurality of image forming apparatuses transmitted to the management apparatus.

3. The management system according to claim 1, wherein the display unit displays information on component replacement identified based on the pieces of condition information of the plurality of image forming apparatuses transmitted to the management apparatus.

4. The management system according to claim 1, wherein the condition information is information based on an operating state of a movable component of the image forming apparatus.

5. The management system according to claim 1, further comprising
   a selection unit through which information displayed by the display unit is selected,
   wherein the display unit displays, on the same screen, in accordance with a selection made through the selection unit, data calculated from the pieces of condition information of the plurality of image forming apparatuses transmitted to the management apparatus, and the condition information stored in the storage unit.

6. The management system according to claim 1, wherein the detection unit is composed of a plurality of sensors.

7. An image forming apparatus connectable to a management apparatus connectable to another image forming apparatus via a network, the image forming apparatus comprising:
   a detection unit configured to detect a condition of the image forming apparatus;
   a storage unit configured to store condition information acquired by the detection unit detecting the condition; and
   a display unit configured to display information,
   wherein the display unit displays, on a same screen, data based on condition information of the other image forming apparatus transmitted to the management apparatus, and data based on the condition information stored in the storage unit,
   wherein the condition information is information based on an operating state of the image forming apparatus.

8. The image forming apparatus according to claim 7, wherein the display unit displays a threshold value of a normal operation range identified based on the condition information of the other image forming apparatus transmitted to the management apparatus.

9. The image forming apparatus according to claim 7, wherein the display unit displays information on component replacement identified based on the condition information of the other image forming apparatus transmitted to the management apparatus.

10. The image forming apparatus according to claim 7, wherein the condition information is information based on an operating state of a movable component of the image forming apparatus.

11. The image forming apparatus according to claim 7, further comprising
   a selection unit through which information displayed by the display unit is selected,
   wherein the display unit displays, on the same screen, in accordance with a selection made through the selection unit, the data based on the condition information of the other image forming apparatus transmitted to the management apparatus, and the data based on the condition information stored in the storage unit.

12. The image forming apparatus according to claim 7, wherein the detection unit is composed of a plurality of sensors.

* * * * *